(12) United States Patent
Wright et al.

(10) Patent No.: US 8,258,966 B2
(45) Date of Patent: Sep. 4, 2012

(54) PEST DETECTOR

(75) Inventors: Paul Wright, Sheffield (GB); Mark Hoppé, Stein (CH); Bruce Grieve, Bracknell (GB); Reyad Sawafta, Greensboro, NC (US)

(73) Assignees: Syngenta Limited (GB); Syngenta Crop Protection LLC, Greensboro, NC (US)

( * ) Notice: Subject to any disclaimer, the term of this patent is extended or adjusted under 35 U.S.C. 154(b) by 582 days.

(21) Appl. No.: 12/514,344

(22) PCT Filed: Nov. 12, 2007

(86) PCT No.: PCT/US2007/084382
§ 371 (c)(1),
(2), (4) Date: Nov. 19, 2009

(87) PCT Pub. No.: WO2008/063939
PCT Pub. Date: May 29, 2008

(65) Prior Publication Data
US 2010/0083556 A1 Apr. 8, 2010

Related U.S. Application Data

(60) Provisional application No. 60/865,636, filed on Nov. 13, 2006.

(51) Int. Cl.
*A01M 1/20* (2006.01)
(52) U.S. Cl. ............... 340/573.2; 43/107; 43/121
(58) Field of Classification Search ............... 340/573.2; 43/107, 121
See application file for complete search history.

(56) References Cited

U.S. PATENT DOCUMENTS

| | | | |
|---|---|---|---|
| 4,937,968 A * | 7/1990 | Thomas | 43/69 |
| 6,016,625 A | 1/2000 | Bishoff et al. | |
| 6,166,641 A * | 12/2000 | Oguchi et al. | 340/573.1 |
| 6,439,069 B1 | 8/2002 | Cates | |
| 7,086,196 B2 | 8/2006 | Cink et al. | |
| 2002/0144453 A1 | 10/2002 | Su | |
| 2004/0079025 A1 | 4/2004 | Snell et al. | |
| 2004/0140900 A1 | 7/2004 | Barber et al. | |
| 2005/0190063 A1 * | 9/2005 | Lewis | 340/573.2 |
| 2006/0142157 A1 | 6/2006 | Birthisel et al. | |
| 2006/0265944 A1 * | 11/2006 | Meier et al. | 43/131 |

FOREIGN PATENT DOCUMENTS

WO 2004008848 1/2004

* cited by examiner

*Primary Examiner* — Jennifer Mehmood
*Assistant Examiner* — Andrew Bee
(74) *Attorney, Agent, or Firm* — William A. Teoli, Jr.

(57) ABSTRACT

A device and related method for monitoring, detecting and/or controlling pests such as rodents and insects, including termites, are disclosed which comprises: (a) encouraging a first characteristic behavior by the pests that is indicative of the presence of one or more of the pests; (b) discouraging a second characteristic behavior by the pests that at least partially interferes with detection of the first characteristic behavior; and (c) observing, detecting or sensing an occurrence of the first characteristic behavior by one or more of the pests. In one embodiment, the device comprises at least one photonic device; a light conductive assembly in optical association with the at least one photonic device, the assembly comprising first and second spaced apart components having first and second opposed light transmitting surfaces forming between them a spatial region adapted to contain a pest bait member comprised of one or more materials susceptible to consumption or displacement by the pests.

22 Claims, 23 Drawing Sheets

US 8,258,966 B2

PEST DETECTOR

This application is a 371 of International Application No. PCT/US2007/084382 filed Nov. 12, 2007, which claims priority to U.S. 60/865,636 filed Nov. 13, 2006, the contents of which are incorporated herein by reference.

FIELD OF THE INVENTION

The present invention relates to a pest detector for monitoring and/or controlling pest activity.

BACKGROUND

Termites invade houses in their search for cellulosic foodstuffs. The damage to US properties is put at about $1 billion per annum. Various methods have been used to protect buildings from being infested with termites, and many more methods used to rid the buildings of termites once infested.

The market has historically been dominated by pre-construction intensive spray application of long residual pesticides on to a foundation soil surface prior to the laying of the concrete slab over a plastic sheet such as a Damp-Proof Membrane-DPM, vapor barrier, vapor retarder or the like. Such pesticides as organo-phosphates—eg chlorpyrifos, pyrethroids (e.g. cypermethrin and lambda cyhalothrin) have been employed. More recently, products such as imidacloprid and fipronil have been employed. Other, more environmentally acceptable, methods of termite-proofing a dwelling place have also been developed such as establishing physical barriers to termite entry (e.g. stainless steel mesh underlays, thick paints, composite materials). These have usually not contained pesticides.

Some more recent methods of termite control involve baiting the termite colony with a cellulose matrix containing a termite toxicant. Known bait stations include above-ground stations useful for placement on termite mud tubes and below-ground stations having a tubular outer housing that is implanted in the ground with an upper end of the housing substantially flush with the ground level to avoid being damaged by a lawn mower. A tubular bait cartridge containing a quantity of bait material (with or without any toxic active ingredient) is inserted into the outer housing. In one practice, a baiting system comprising a plurality of bait stations is installed underground around the perimeter of a building. Individual stations are installed in prime termite foraging areas as monitoring devices to get "hits" (termites and feeding damage). When termite workers are found in one or more stations, a bait material containing a toxic active ingredient is substituted for the monitoring bait so that the termite workers will carry it back to the termite nest and kill a portion of the exposed colony. However, this approach does not work if the termites completely consume the monitoring bait and abandon a particular station before the hit is discovered by a technician and the station is baited with toxicant. This problem can be mitigated by increasing a manual inspection interval for individual bait stations. However, the drawback to this approach is a substantial increase in the overall cost of maintaining the baiting system and a reduction in its overall efficiency.

Accordingly, despite the availability of existing baiting stations and systems, there exists a need for more cost effective and reliable detection of termite activity in bait stations for faster colony elimination and enhanced structural protection of buildings.

SUMMARY OF THE INVENTION

The present invention relates to an apparatus and method of detecting the presence of target pests which comprises: (a) encouraging a first characteristic behavior by the pests that is indicative of the presence of one or more of the pests; (b) discouraging a second characteristic behavior by the pests that at least partially interferes with detection of the first characteristic behavior; and (c) observing, detecting or sensing an occurrence of the first characteristic behavior by one or more of the pests.

In one embodiment, the first characteristic behavior is selected from bait consumption and bait displacement, for example, and the second characteristic behavior is selected from backfilling with detritus, constructing mud tubes and constructing galleries, for example.

In another embodiment, the target pest is selected from a rodent and an insect.

In a further embodiment, the target pest is an insect selected from a termite and an ant.

In another embodiment, the present invention is directed to a device for monitoring, detecting and/or controlling target pests that comprises:

(1) a detection assembly including first and second spaced apart components having first and second opposed surfaces and forming between them at least one spatial region;
(2) at least one opening in pest communication with said spatial region to allow access to the spatial region of the assembly by the target pests; and
(3) at least one bait member comprised of one or more materials susceptible to consumption or displacement by the target pests which is adapted to be contained or partially contained within the spatial region;

wherein the spatial region is configured to encourage the target pests to consume or displace at least a portion of the bait member and to discourage or restrict the target pests from backfilling the region with detritus, constructing mud tubes or constructing galleries.

Advantageously, the present invention provides a behaviorally selective detector configuration which facilitates the observation, detection or sensing of any changes to the bait member or its attendant properties. Detectable changes to the bait member are occasioned by the selected behavior configuration (consumption or displacement) and are obscured by the non-selected behavior configuration (e.g., backfilling with detritus, mud tube construction or gallery construction). The observed, detected or sensed changes to the bait member or its properties are indicative of target pest activity.

The apparatus and method of the invention are particularly suitable for monitoring, detecting and/or controlling arthropods and in particular insect pests. In particular, apparatus and method of the invention are suitable for monitoring, detecting and/or controlling termites.

Accordingly, the present invention further relates to an apparatus and method of detecting the presence of termites which comprises: (a) encouraging a first characteristic behavior by termites that is indicative of the presence of one or more of the termites; (b) discouraging a second characteristic behavior by the termites that at least partially interferes with detection of the first characteristic behavior; and (c) observing, detecting or sensing an occurrence of the first characteristic behavior by one or more of the termites.

In one embodiment, the spatial region of the termite detector assembly is configured such that termites are substantially discouraged from backfilling with detritus or constructing mud tubes or galleries within said region, but without impeding the termites from consuming or displacing at least a portion of the bait member therein. This may be achieved, for example, by sizing the spatial region to correspond with the dimensions of the target termite. In particular, the height of the spatial region can be configured to encourage termite feeding or chewing and to discourage backfilling with detritus or construction of mud tubes, tunnels or galleries by the termites. For example, the height of the spatial region can substantially correspond to the dimension of the target pest such as a termite, for example.

In one embodiment, the present invention is directed to a device for monitoring, detecting and/or controlling termites comprising at least one photonic device and a light conductive assembly in optical association with the at least one photonic device. The light conductive assembly comprises first and second spaced apart optical components having first and second opposed light propagating surfaces forming between them at least one spatial region which is adapted to contain or partially contain a termite bait member. The bait member is comprised of one or more materials susceptible to consumption or displacement by termites.

Light input into at least one component of the light conductive assembly from a light source propagates along an optical pathway which extends from the first light propagating surface, across the spatial region and to a second light propagating surface. Light propagation across the spatial region interrogates the bait member when it is present therein by being impeded or partially impeded thereby. Subsequently, as the bait member is consumed or displaced by termites, light passes through the spatial region and to the second light propagating surface and the remainder of the optical pathway. The intensity of light traversing the assembly increases as the bait member is consumed or displaced by termites and is indicative of termite activity.

In one embodiment, the detector comprises a substantially opaque bait member; a light source operable to direct light onto at least a portion of the bait member; and a light detector operable to detect at least some light emitted by the light source; wherein the bait member, light source, and light detector are arranged such that the bait member substantially prevents or reduces light being emitted by the light source from reaching and being detected by the light detector when the bait member is unaltered, and such that at least some light emitted by the light source is detectable by the light detector when at least a portion of the bait member is consumed or displaced by pest activity.

In addition, the invention also relates to a termite detector comprising:
(1) a light source from which a light beam propagates when the light source is energized;
(2) a light detector having a light receiving surface and producing an electric signal in response to light incident on the light receiving surface; and
(3) a light conductive assembly in optical association with the light source and the light detector, the light conductive assembly including: first and second spaced-apart optical components having respective first and second opposed light propagating surfaces forming between them a spatial region adapted to contain a termite bait member comprised of one or more materials susceptible to consumption or displacement by termites and having optical propagation characteristics different from ambient air.

In one embodiment, the first and second optical components have light directing properties that cooperate to direct at least a portion of the light beam that propagates from the light source between the first and second light propagating surfaces when the light is energized and to direct at least a portion of said light beam on to the bait member which has an optical density greater than ambient air and which impedes or partially impedes propagation of the light beam. When at least a portion of the bait member occupying the spatial region is removed or displaced by termites, the light beam or a portion thereof continues more or less unimpeded through the spatial region and toward the light detector for incidence on its light receiving surface. This incidence causes the light detector to produce an electric signal that corresponds to a detectable change in the optical properties of the bait material when it is removed or displaced. Such a change in the optical characteristics of the bait material is indicative of termite activity.

In an additional embodiment of the invention, the termite detector is associated with a data collector that processes the electric signal from the light detector to provide data relating to removal or displacement of the bait member and, optionally, a transmitter that transmits said data over a wired or wireless communication link.

In another aspect of the invention, the termite detector is completely sealed in a weather-resistant enclosure, especially against the entry of moisture, so that the detector can remain in the environment for extended periods until termite feeding occurs. In one aspect, the termite detector is enclosed in a station housing having at least one opening hermetically sealed with a material through which termites can tunnel or chew. The housing opening can be configured to lead or guide the termites toward the spatial region of the detector which contains the bait member. The detector contains at least one opening in the spatial region that is sealed by the bait member. Termites enter the spatial region of the detector by consuming or displacing at least a portion of the bait member therein.

In one embodiment, the device for monitoring, detecting and/or controlling pests is a bait station for subterranean termites comprising:
an outer housing adapted to be implanted in the ground having a plurality of openings through a side wall of the outer housing for passage of termites through the openings into an interior of the outer housing, the interior of the outer housing adapted to receive at least one cartridge selected from a termite bait cartridge and a termite detector cartridge;
the bait cartridge comprising one or more materials susceptible to consumption or displacement by termites and, optionally, a termite toxicant;
the detector cartridge comprising at least one photonic device; a light conductive assembly in optical association with the at least one photonic device, the assembly comprising first and second spaced apart components having first and second opposed light transmitting surfaces forming between them a spatial region adapted to contain a termite bait member comprised of one or more materials susceptible to consumption or displacement by termites and having optical transmission characteristics that differ from ambient air.

The invention also relates to a termite monitoring or control system, comprising: a plurality of subterranean termite monitoring or baiting stations, two or more of said stations each including a substantially opaque bait member; a light source operable to direct light onto at least a portion of the bait member; and a light detector operable to detect at least some light emitted by the light source; wherein the bait member, light source, and light detector are arranged such that the bait member substantially prevents light emitted by the light source from being detected by the light detector when the bait member is unaltered, and such that at least some light emitted by the light source is detectable by the light detector when at least a portion of the bait member is consumed or displaced by pest activity, the second one of the stations being spaced apart from the first one of the stations.

A related method for using the termite monitoring or control system for reducing termite feeding damage in a wooden structure is provided, comprising: installing such system around the exterior of said structure. It will also be appreciated that the detector cartridge of the invention is suitable for use in above-ground termite or other target pest bait stations and can be adapted for the detection of other target pests such as rodents and non-termite insect species including ants, for example.

BRIEF DESCRIPTION OF THE DRAWINGS

Figure 1:
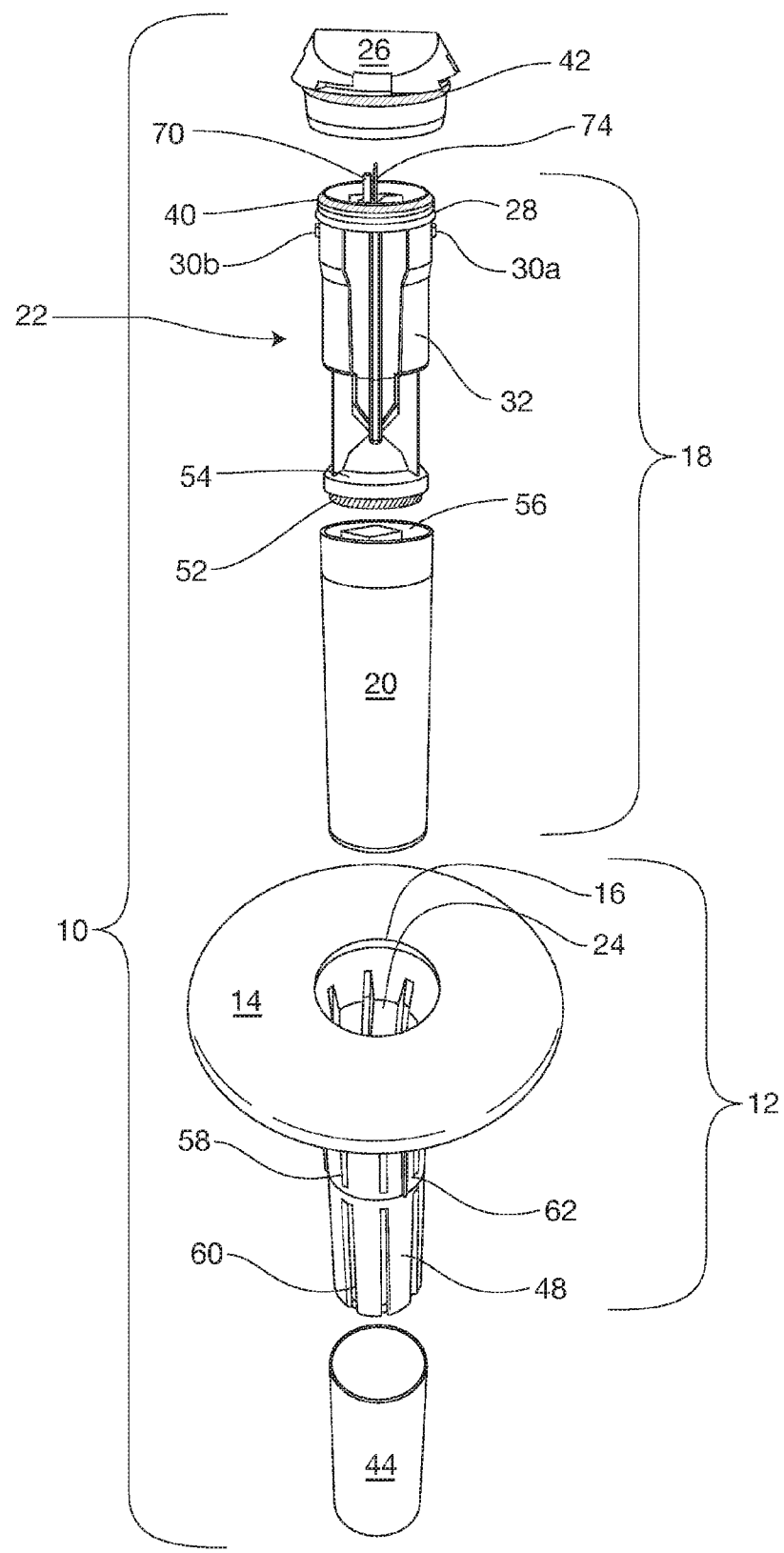
Figure 2:
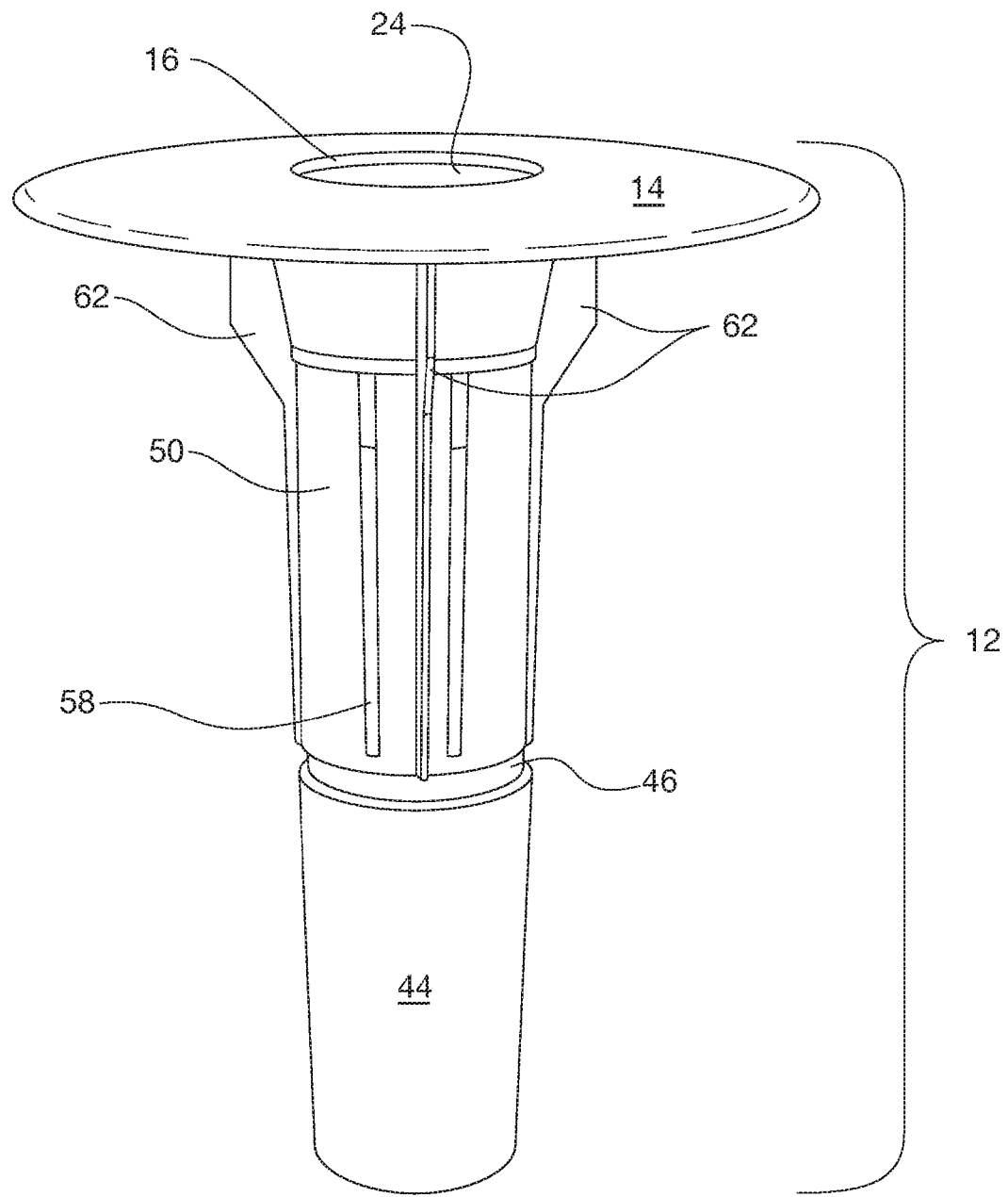
Figure 3:
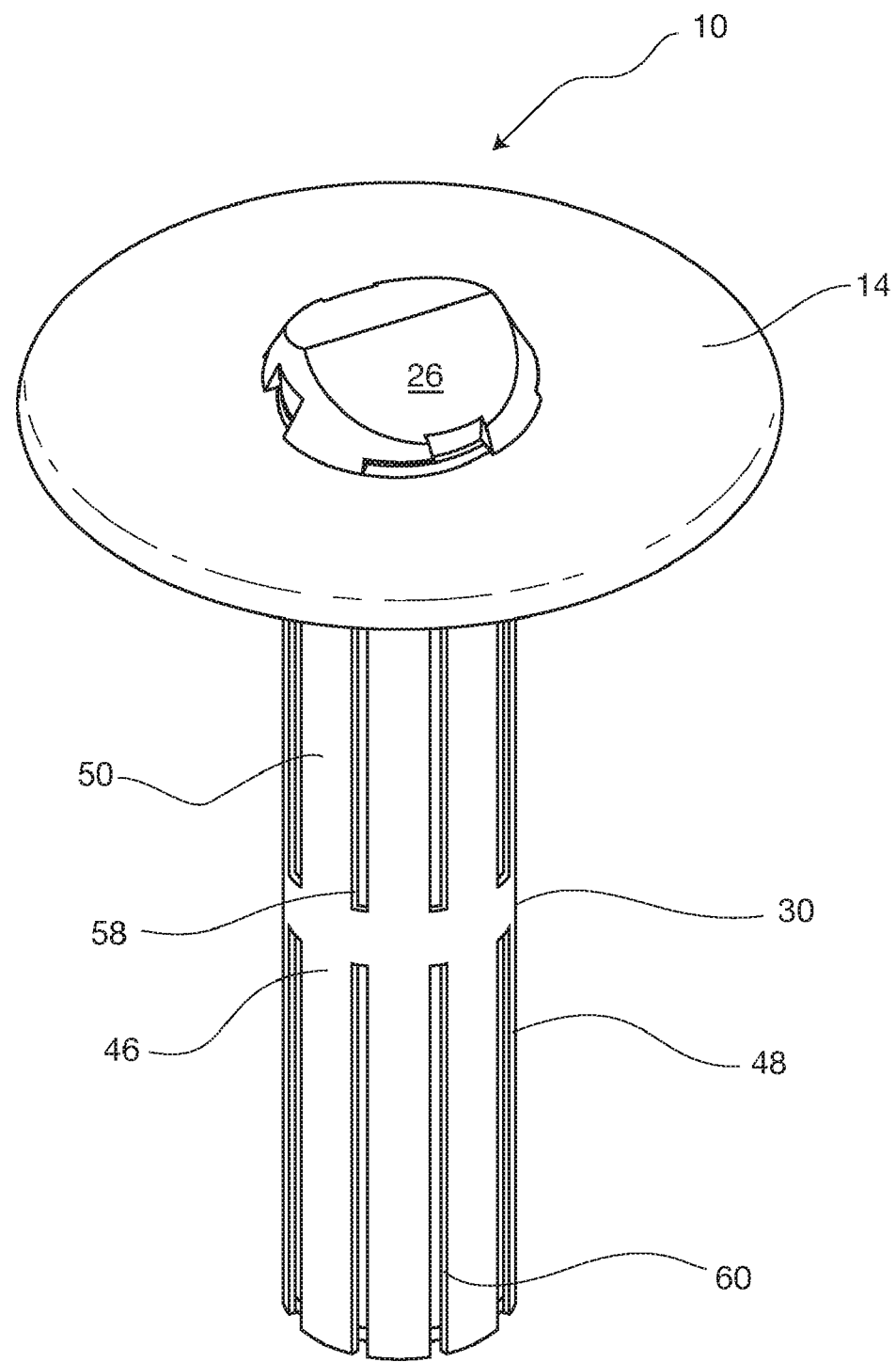
Figure 4:
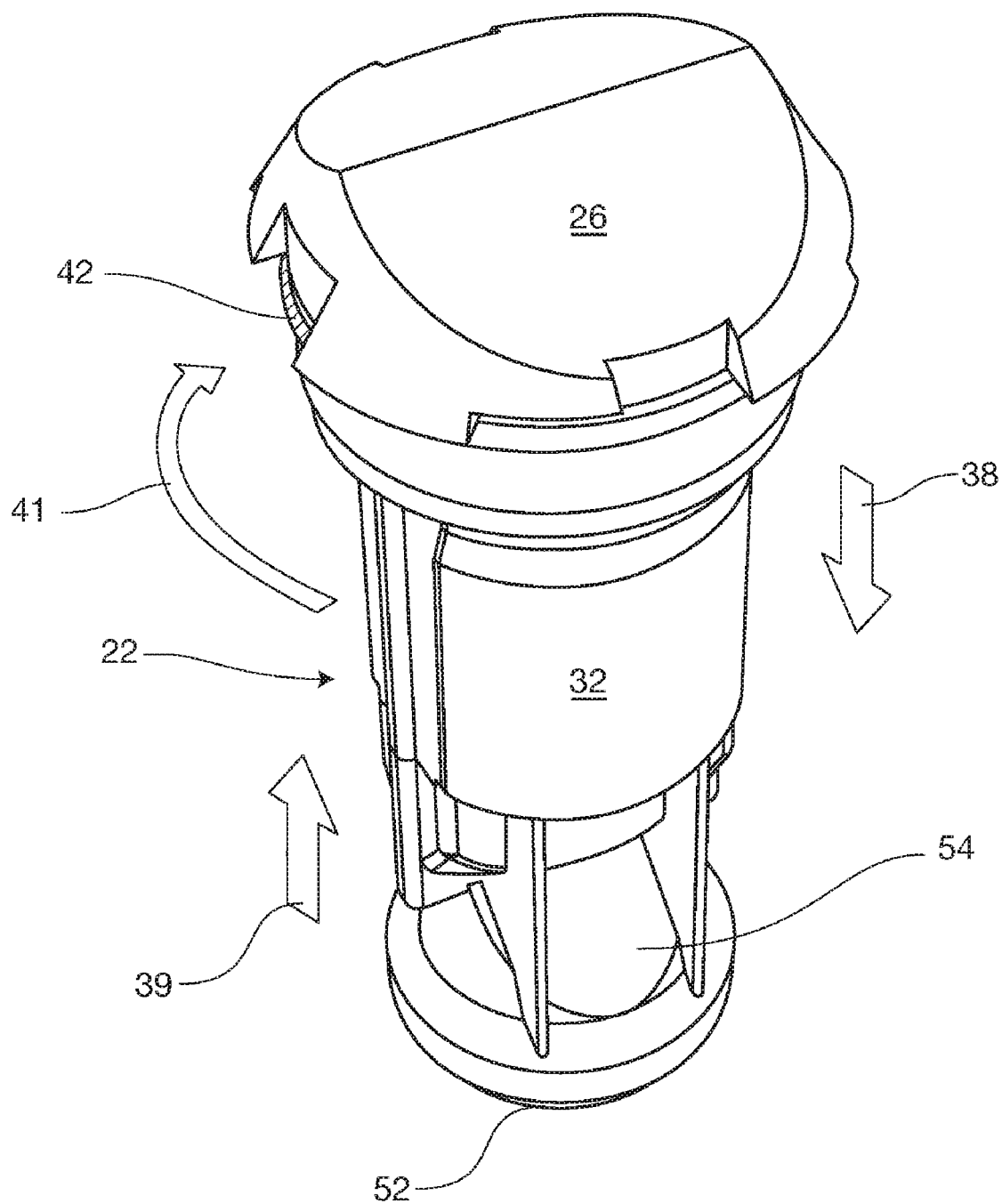
Figure 5:
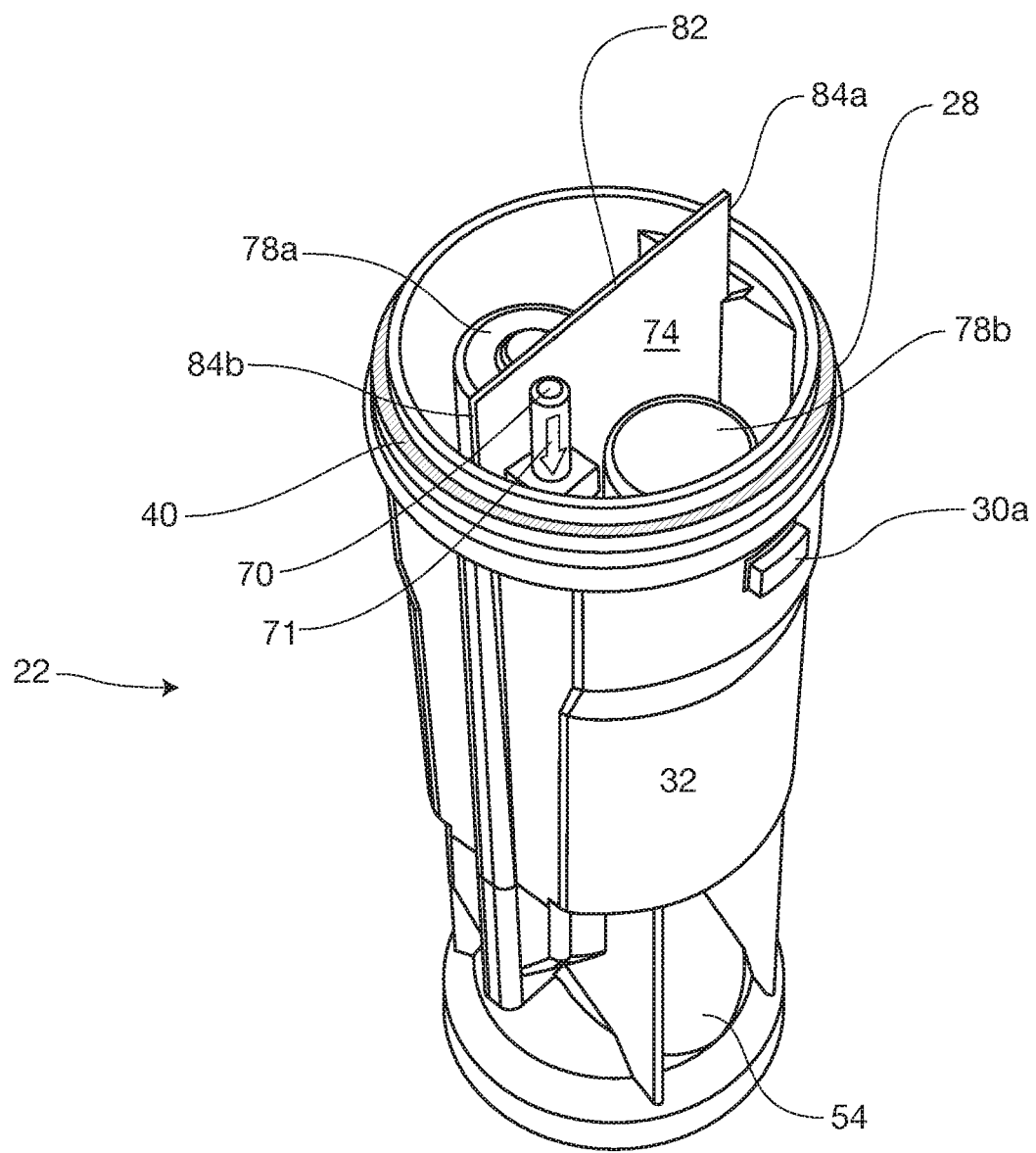
Figure 6:
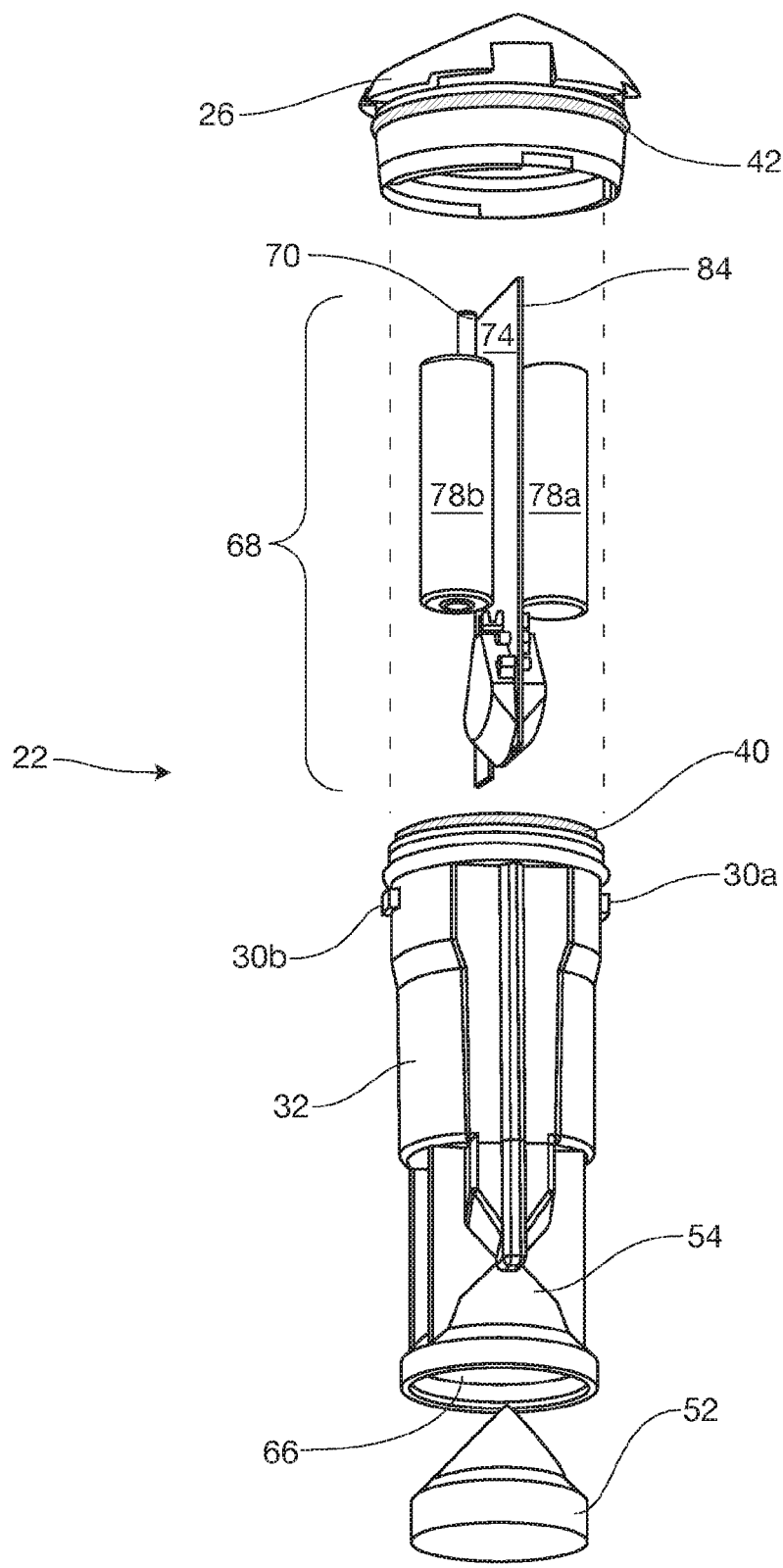
Figure 7:
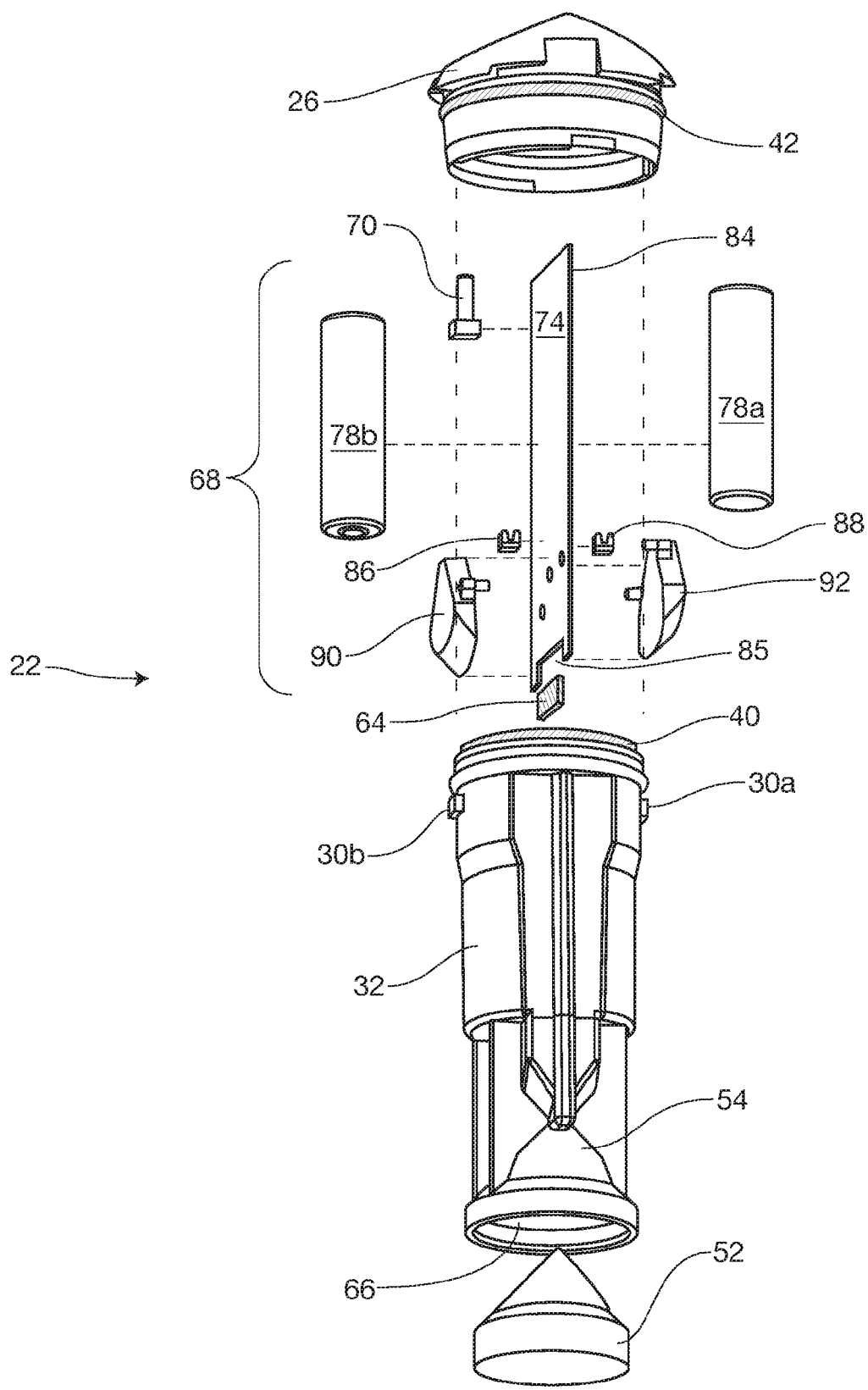
Figure 8:
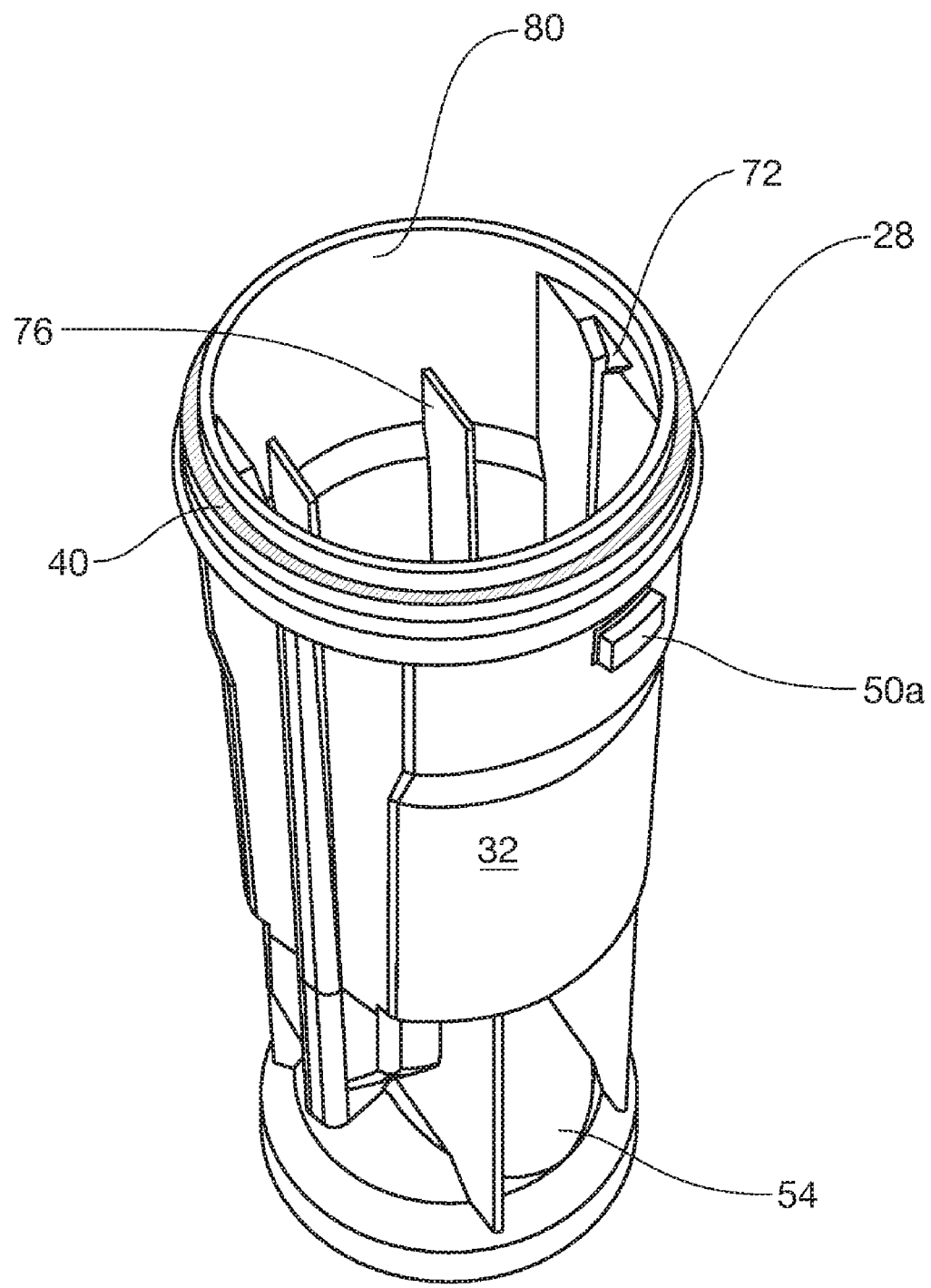
Figure 9:
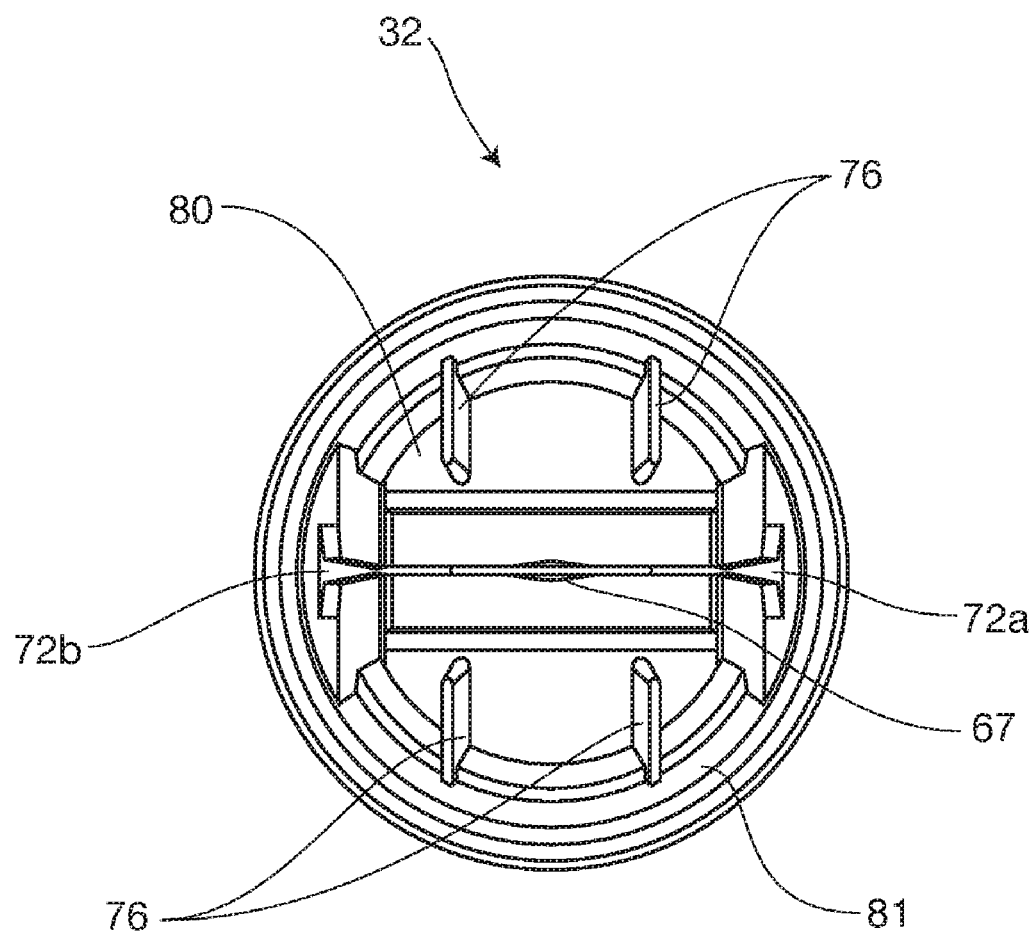
Figure 10:
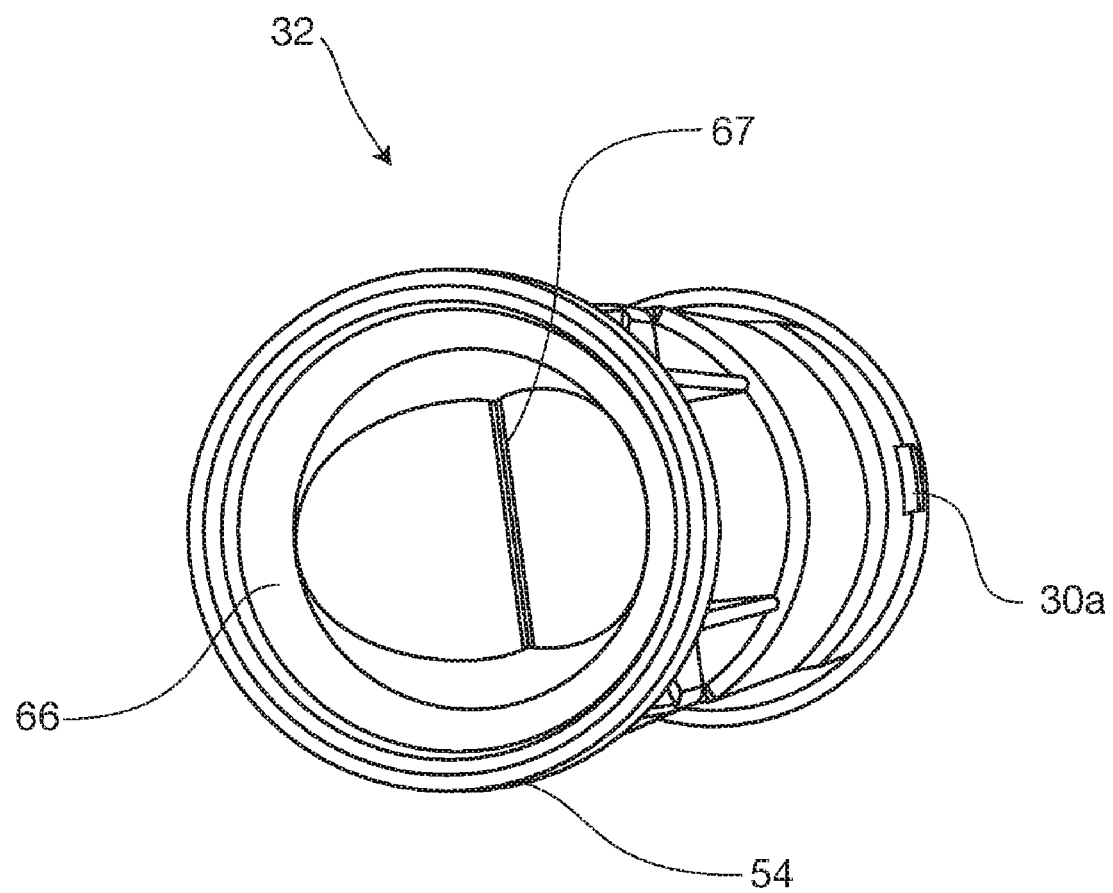
Figure 11:
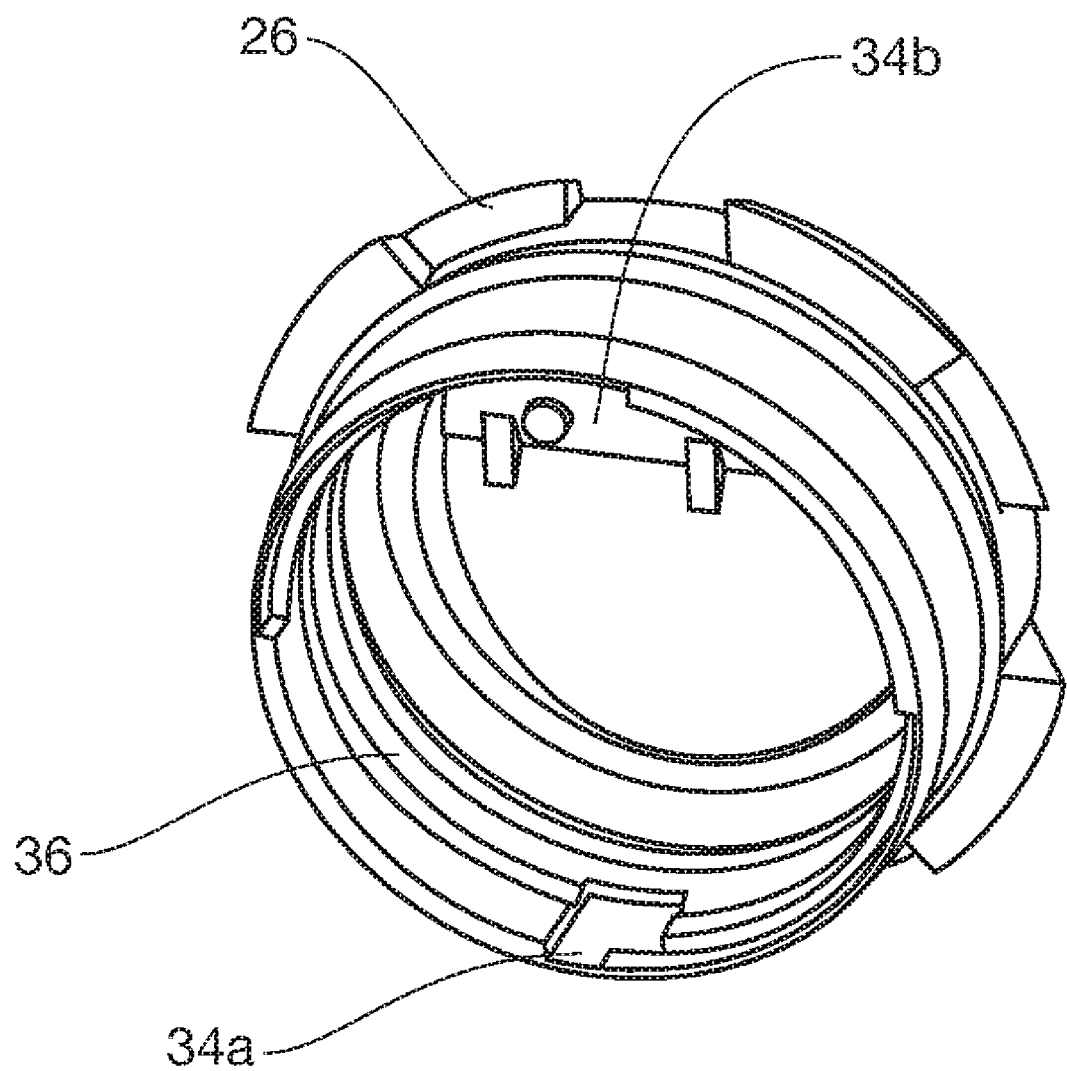
Figure 12:
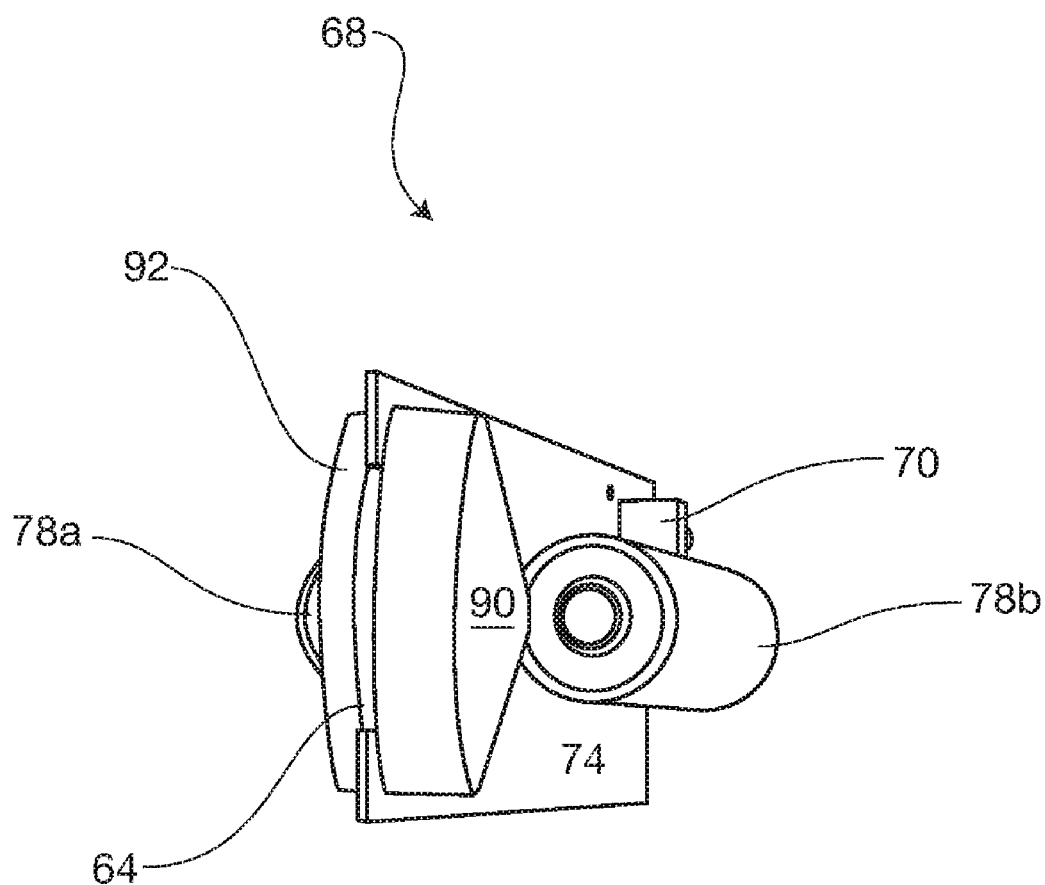
Figure 13:
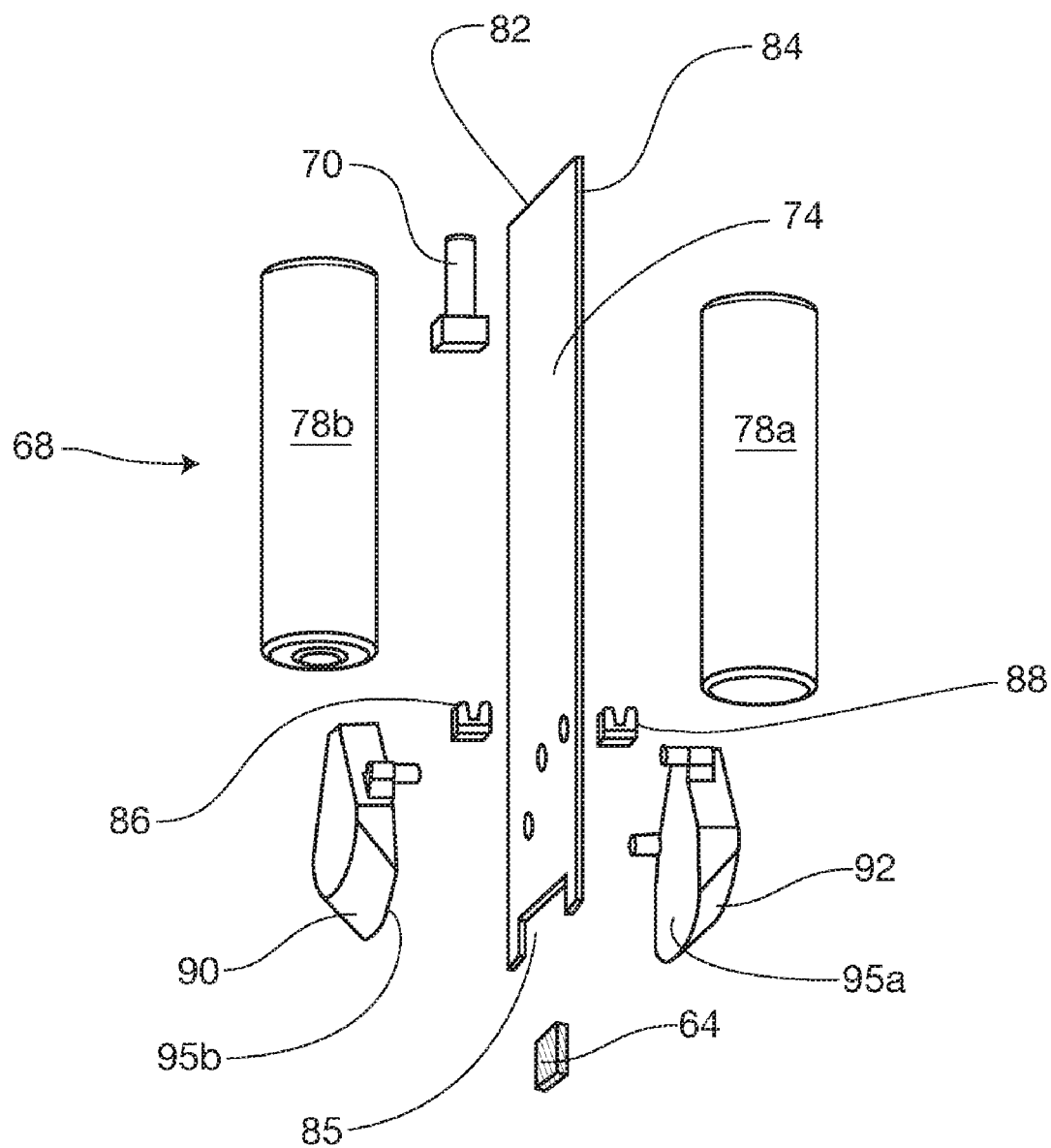
Figure 14:
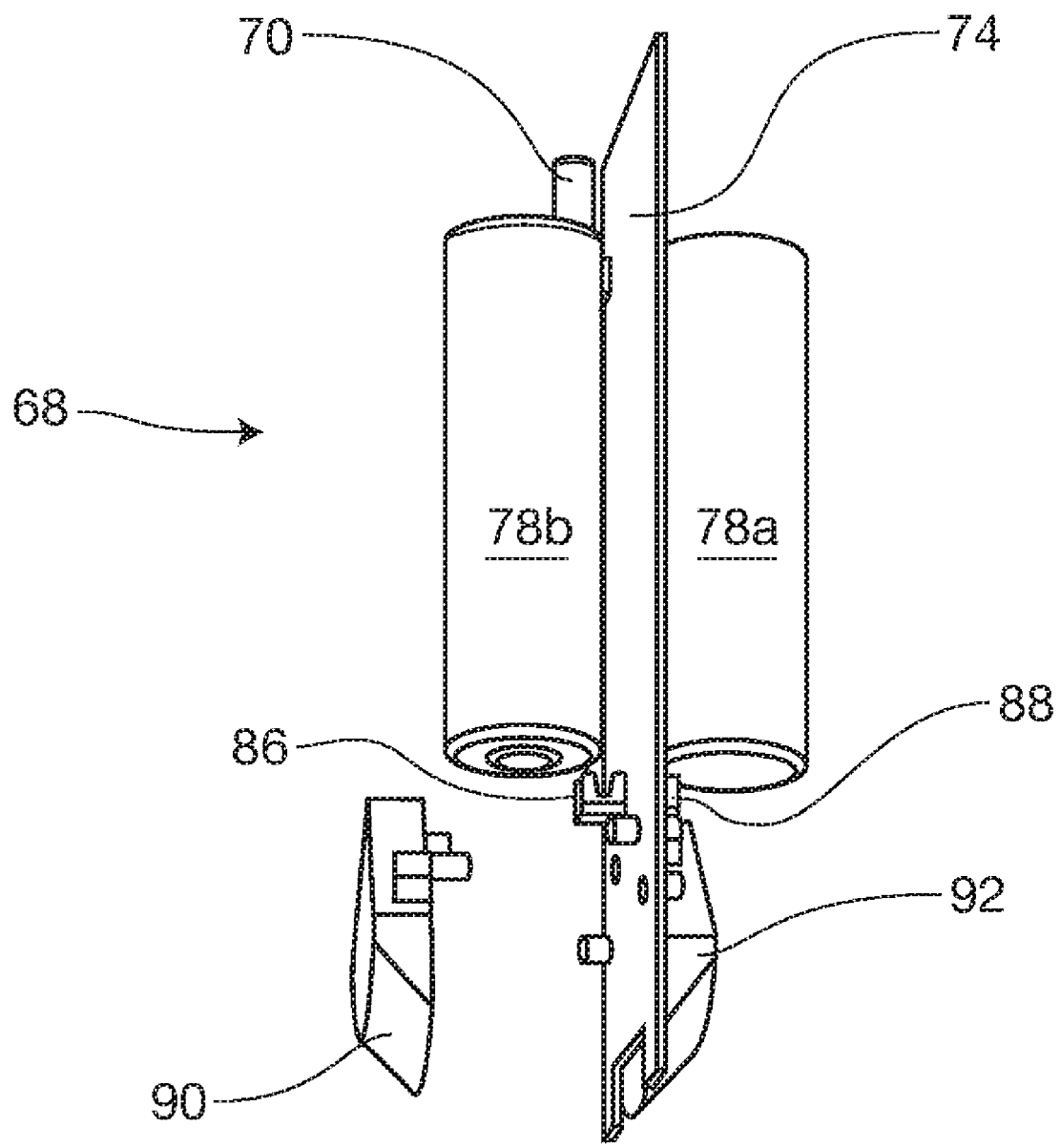
Figure 15:
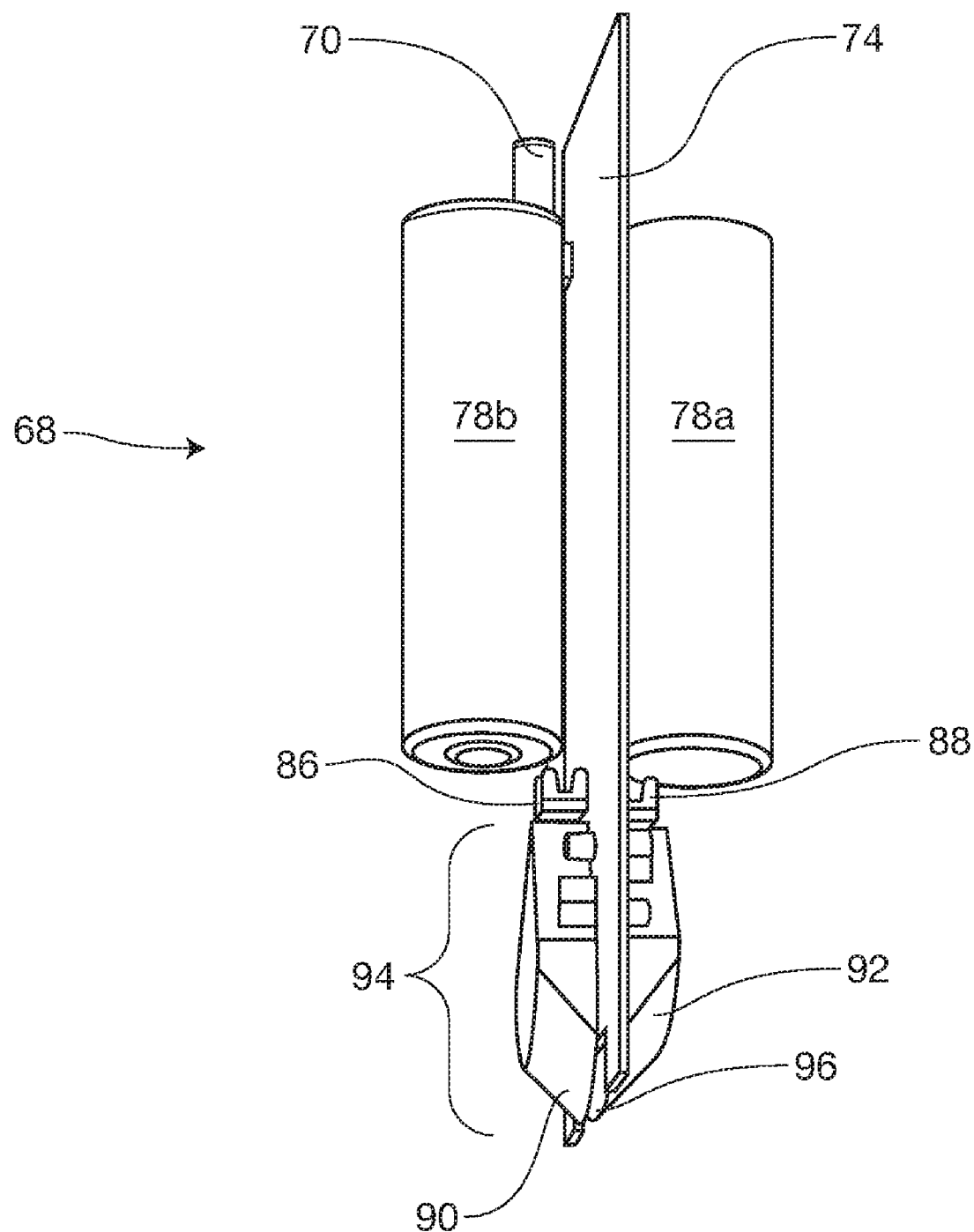
Figure 16:
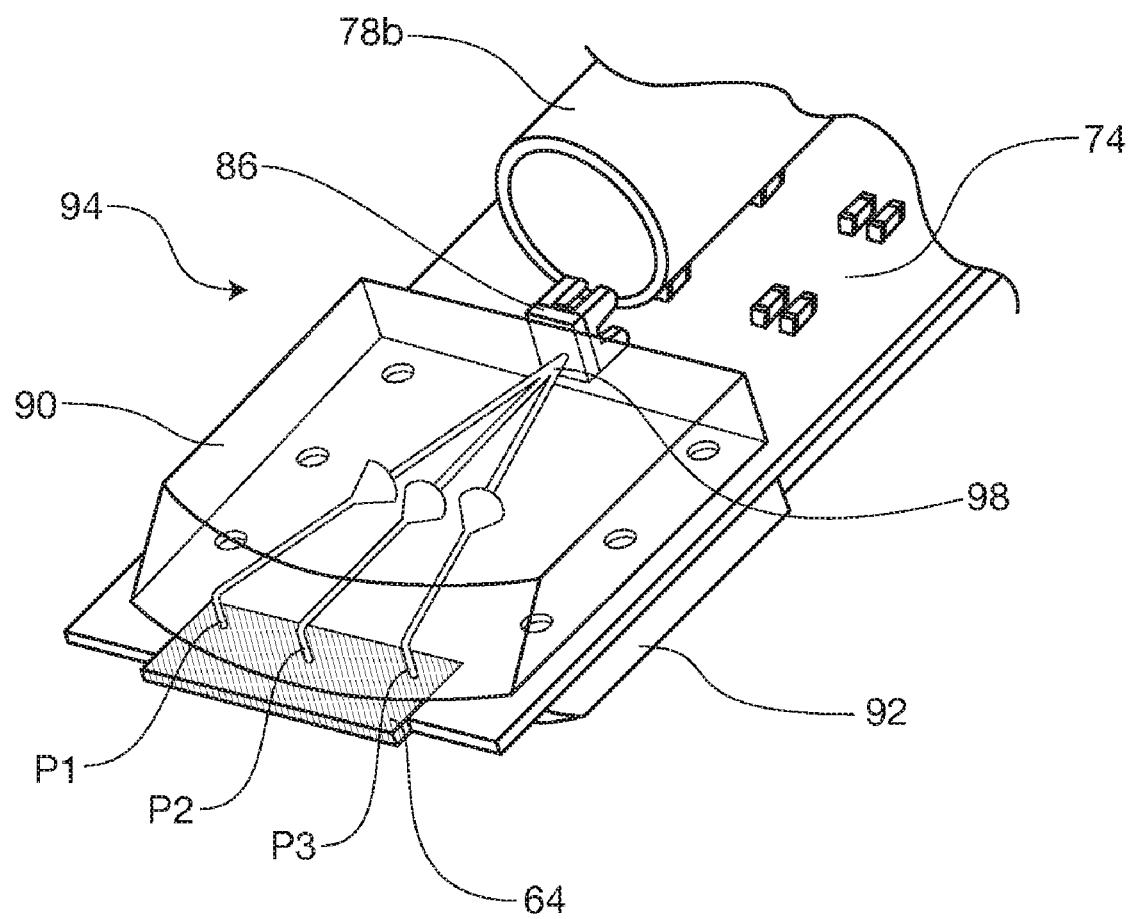
Figure 17:
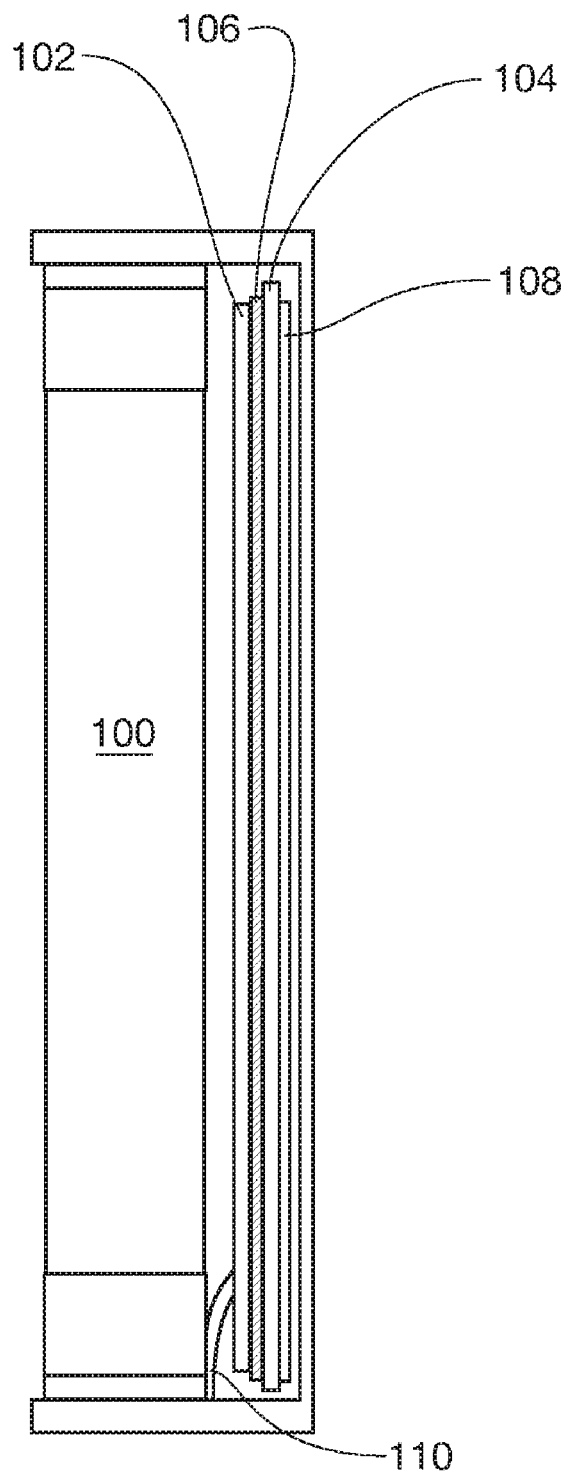
Figure 18:
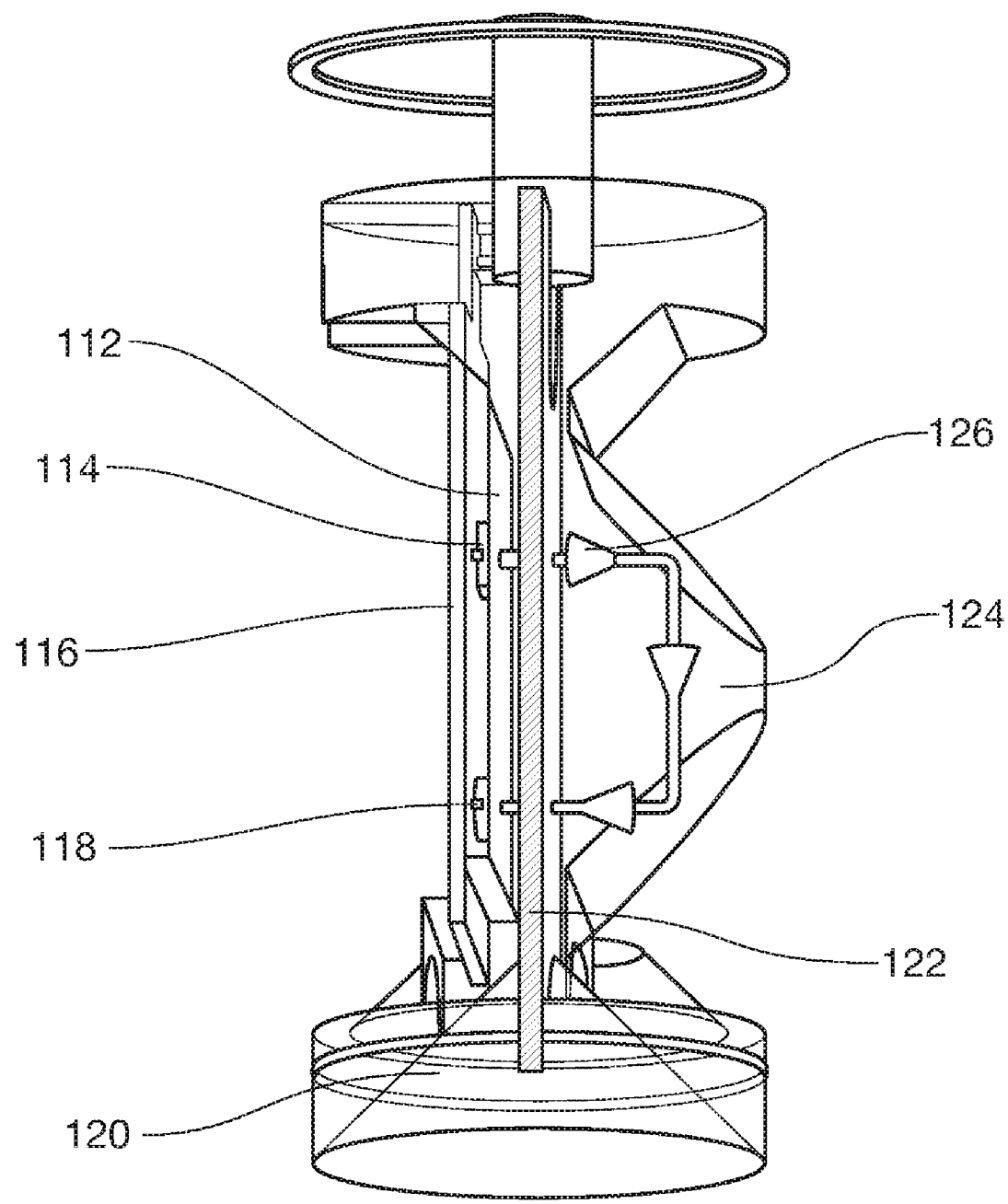
Figure 19:
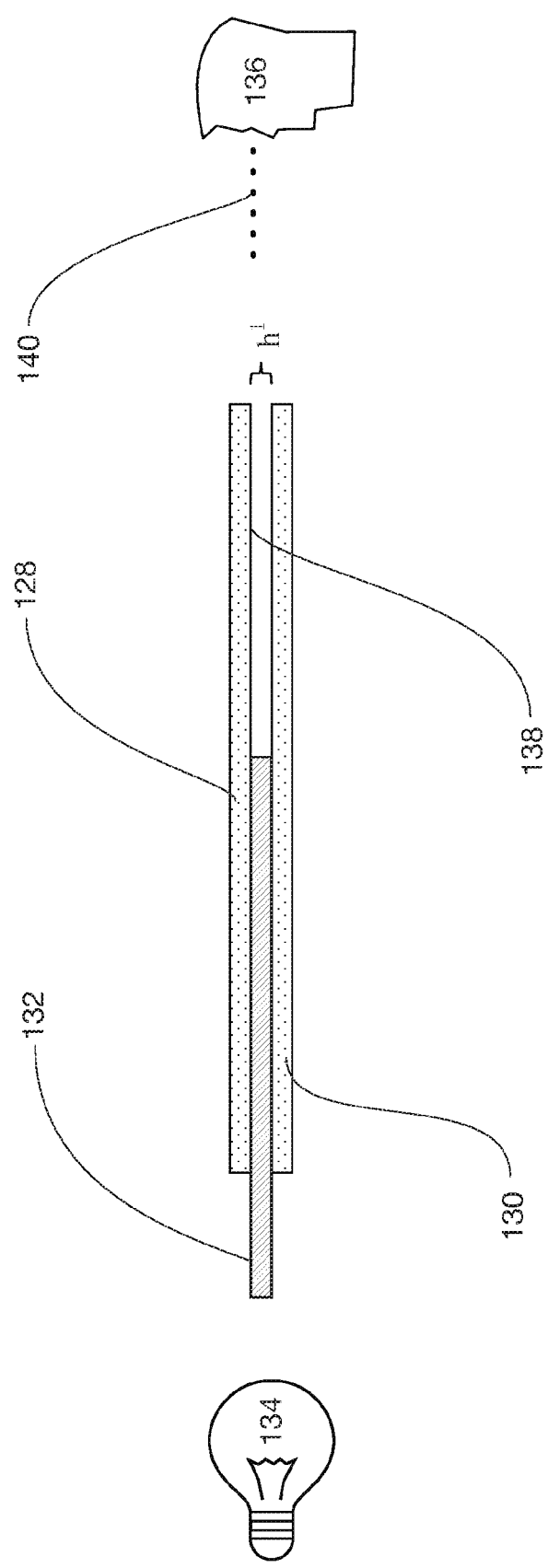
Figure 21:
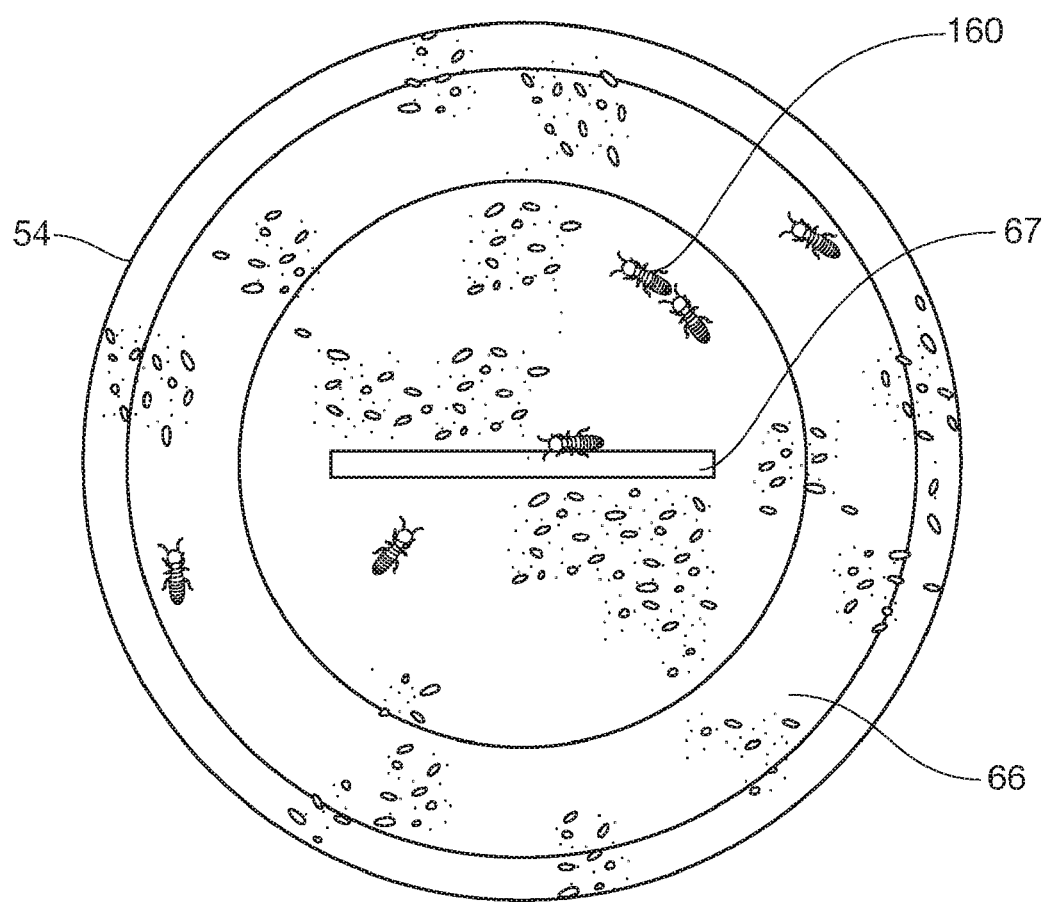
Figure 22:
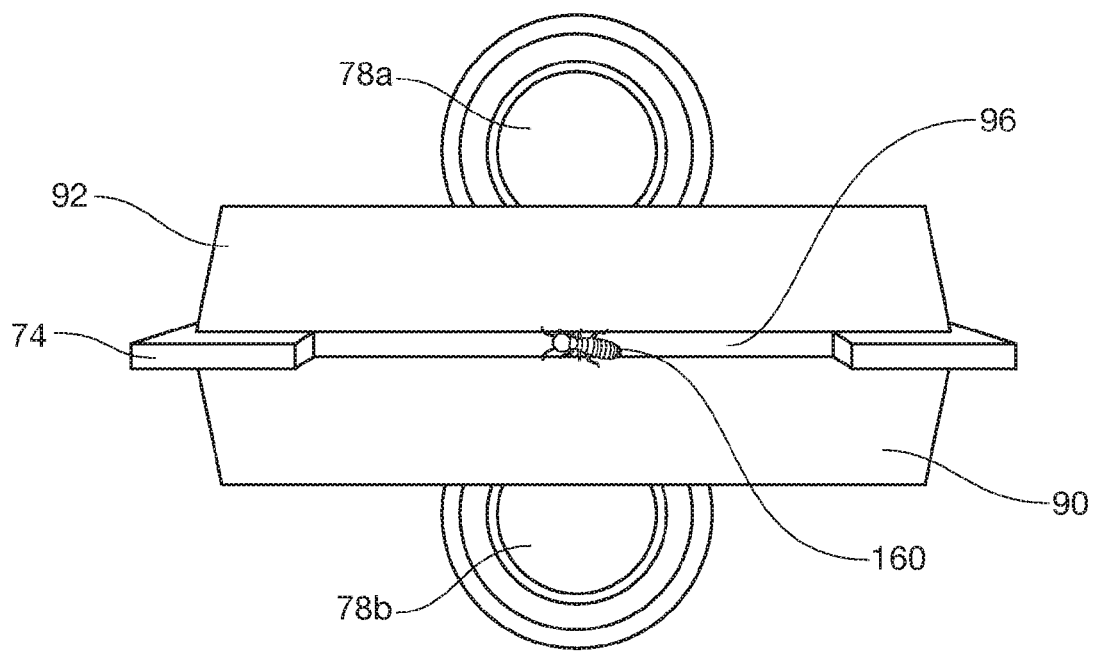
Figure 23:
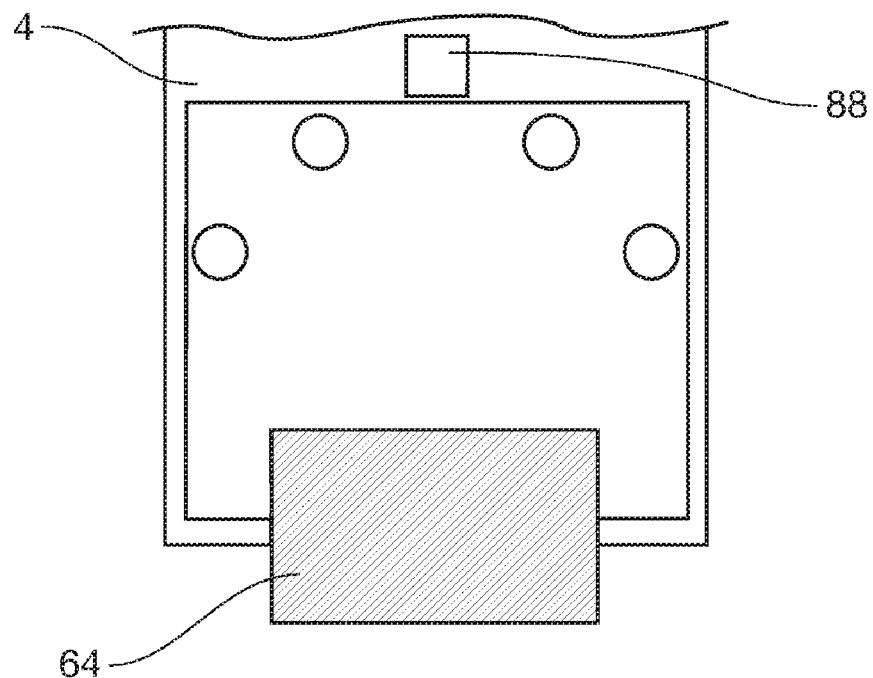
Figure 24:
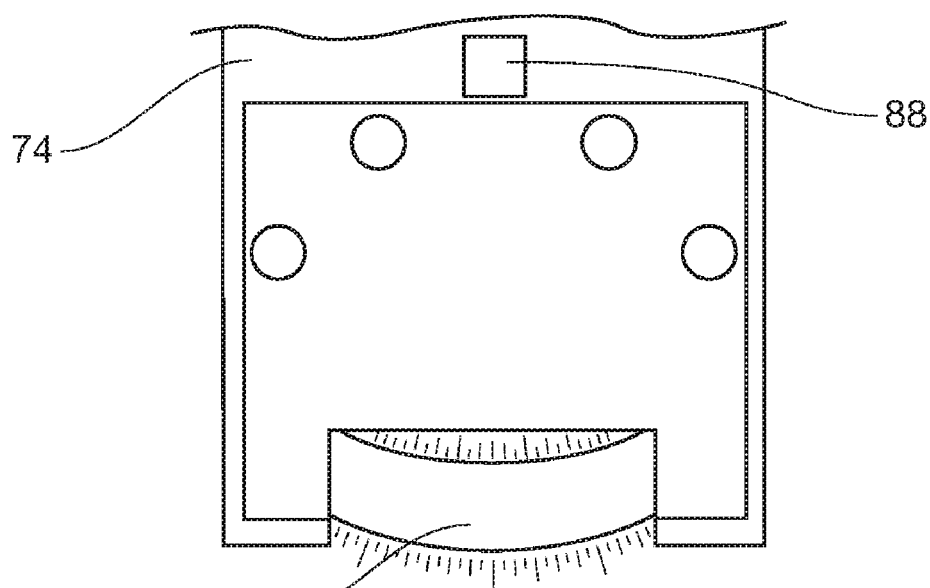

Having thus described the invention in general terms, reference will now be made to the accompanying drawings, which are not necessarily drawn to scale, and wherein:

FIG. 1 illustrates an exploded elevation of a bait station device for monitoring, detecting and/or controlling subterranean termites in accordance with one embodiment of the invention;

FIG. 2 illustrates a perspective view of a partially assembled bait station of FIG. 1;

FIG. 3 illustrates a perspective view of a termite bait station in accordance with another embodiment of the invention;

FIG. 4 illustrates a perspective view of the termite detector cartridge shown in FIG. 1 with the cap attached;

FIG. 5 illustrates a perspective view of the cartridge of FIG. 4 without a cap;

FIG. 6 illustrates a partially exploded side view of the cartridge of FIG. 4;

FIG. 7 illustrates a fully exploded side view of the cartridge of FIG. 4;

FIG. 8 illustrates a top perspective view of a detector cartridge casing in accordance with one embodiment of the invention;

FIG. 9 illustrates a top view of the detector cartridge casing shown in FIG. 8;

FIG. 10 illustrates a bottom perspective view of the detector cartridge casing of FIG. 8;

FIG. 11 illustrates a bottom perspective view of a cap in accordance with one embodiment of the invention;

FIG. 12 illustrates a bottom perspective view of an optical sensor unit in accordance with one embodiment of the invention;

FIG. 13 illustrates a fully exploded side view of the optical sensor unit depicted in FIG. 12;

FIG. 14 illustrates a partially exploded side view of the optical sensor unit of FIG. 12;

FIG. 15 illustrates a side view of the optical sensor unit shown in FIG. 12;

FIG. 16 illustrates a partial schematic view of the light conductive assembly of the optical sensor unit shown in FIG. 12;

FIG. 17 illustrates a side perspective view of an optical sensor unit in accordance with another embodiment of the invention;

FIG. 18 illustrates a partial schematic view of an optical sensor unit in accordance with another embodiment of the invention;

FIG. 19 illustrates a schematic cutaway view of a detection assembly in accordance with one embodiment of the invention;

FIGS. 20a-d illustrate an optical sensor unit as used in the examples;

FIG. 21 illustrates the bottom of a detector cartridge casing with the EPS plug removed which shows termites present in the interior of the conical base of the detector casing (cf. FIG. 10);

FIG. 22 illustrates a bottom view of an optical sensor unit with termites present in the spatial region between the opposed prism faces (cf. FIG. 12);

FIG. 23 illustrates a bait member (cellulose card) placed in the slot or notch at the bottom of the printed circuit board (prisms removed) (cf. FIG. 13); and FIG. 24 illustrates a light propagating surface of one of the prisms of the light conductive assembly (cf. FIG. 14).

DETAILED DESCRIPTION

While the present invention is susceptible to several embodiments in various forms, there is hereinbelow described in detail certain specific embodiments, with the understanding that the present disclosure is to be considered as merely an exemplification of the present invention, without limitation to the specific embodiments or examples discussed.

With reference to FIGS. 1-4, an exemplary termite bait station device for monitoring, detecting and/or controlling termite activity is depicted in accordance with one embodiment of the invention. The bait station, generally designated by reference numeral 10, comprises a substantially hollow housing 12 having a flanged top surface 14 with an opening 16 that is adapted to removeably receive a cartridge array 18. The cartridge array 18 comprises a passive monitoring bait cartridge 20 and a termite detector cartridge 22 and is sized to be slideably received into the interior volume 24 of housing 12 via the opening 16.

Those skilled in the art will appreciate that other housing configurations such as above-ground termite stations, for example, are contemplated by the present invention. In addition, the detector cartridge 22 can be used independently of a housing or bait station depending on the professional judgment of the pest control operator installing and using the cartridge alone or in conjunction with above-ground and/or below-ground stations.

In one embodiment, the combined length of the cartridge array 18 in relation to the length of the housing 12 is such that the array is received within the housing in a manner which does not interfere with placement of the cap 26 to cover the housing opening 16.

In one embodiment, cap 26 is removeably secured to the detector cartridge 22 at the top portion 28 by aligning a pair of tabs 30a,b on the outer casing 32 of the detector cartridge 22 with a pair of slots 34a,b (see FIG. 11) in the interior sidewall 36 of the cap 26. The cap 26 is then moved in the direction of arrow 38 to slide each tab 30 into its respective slot 34 and frictionally engage the cap interior sidewall 36 against a rubber o-ring 40 to removeably secure the cap 26 to casing 32. The cap 26 can be a screw cap or a snap-on cap. When the array 18 is inserted in to the station 10, the compression ring 42 of the cap 26 engages a recessed lip (not shown) located at the top of interior 24 near the opening 16 of the housing 12. An optional pressed cardboard sleeve 44 is adapted to frictionally engage with the side wall 46 of the housing 12.

In use, a hole corresponding in diameter to that of the cylindrical portion of the housing 12 is opened in the ground, and the housing 12 is inserted into the hole until the top surface 14 abuts the upper surface of the ground. The flanged top 14 provides a visual indication to assist an operator to locate the station for a follow-up inspection or changing a bait cartridge (such as replacing a passive bait cartridge 20 with a toxicant containing bait cartridge (not shown) when activity is indicated by detector cartridge 22. In one embodiment, the bait station 10 is loaded with the cartridge array 18 by first placing the passive bait cartridge 20 into the interior 24 of housing 12 via opening 16 such that the cartridge 20 is positioned adjacent to the lower portion 48 of the housing sidewall 46. Likewise, the detector cartridge 22 is placed into the station 10 adjacent to the upper portion 50 of the sidewall 46 such that the plug 52, which closes the detector cartridge base 54, abuts the top 56 of cartridge 20. This increases the probability that termites foraging within the station that begin to consume or tunnel within the passive bait cartridge 20 will also encounter the plug 52 and bait member 64 of detector cartridge 22.

Suitable materials for the passive bait cartridge 20, the sleeve 44, the matrix of the toxicant containing cartridge (not shown) as well as the bait member 64 (see, e.g., FIGS. 7, 13, 16) can comprise cellulose-containing materials including, but not limited to, wood, paper (incl. recycled), corrugated cardboard, pressed cardboard, wood flour, and sawdust, for example. Among the suitable cellulose-containing materials there may also be mentioned α-cellulose, microcrystalline cellulose, highly refined wood, wood particles or wood flour, recycled paper or cellulose ethers such as methylcellulose, hydroxypropylmethylcellulose, and hydroxybutylmethylcellulose. A preferred cellulose-containing matrix is sawdust or wood flour which is not repellent to target termite species. In one embodiment, the passive bait cartridge 20 and the toxicant containing cartridge (not shown) could use the same material, except that no toxicant is impregnated into the material used for the passive bait.

As shown in FIGS. 2-3, the housing 12 include a sidewall 46 with openings that allow subterranean termites to pass through and access the cartridge array 18 (or a toxicant containing bait cartridge (not shown)) when such is received therein. More particularly, the station 10 includes a plurality of vertically elongate openings 58, 60 through the sidewall 46 of the outer housing 12. The openings 58, 60 are spaced apart and are arranged in two sets (both upper 58 and lower 60) and comprise a plurality of vertically extending slots that are spaced circumferentially about the sidewall 46, as shown. In the illustrated embodiment, there are eight openings 58 and eight openings 60 spaced about the circumference of the sidewall 46. It will be understood that this particular arrangement of openings is just one example of a suitable arrangement, and that other arrangements can be used instead. The exemplified embodiment of FIG. 2 also depicts anchors 62 spaced evenly around the sidewall 46 which serve to secure the station in the ground upon insertion into a suitable hole.

FIGS. 4-7 more specifically illustrate a termite detector cartridge 22 in accordance with one embodiment of the invention. The detector cartridge 22 has a cap 26, a sensor unit 68, a casing 32 and a plug 52 formed of a material through which termites can tunnel or chew such as expanded polystyrene.

In one embodiment, casing 32 has a base 54 which is a conically shaped guide flange for guiding termite foraging or travel in a direction towards the bait member 64 (see, e.g., FIG. 7) located inside the detector cartridge 22. The interior 66 of guide flange 54 accommodates a plug 52 which seals the lower end of the cartridge 22 against entry of moisture. The plug 52 can be composed of a weather-resistant material such as expanded polystyrene (EPS) that is also soft enough to be penetrated by termite activity such as feeding, chewing, tunneling, or excavation. The plug 52 can be affixed to the cartridge base with a suitable commercially available adhesive such as ScotchSeal™ Polyurethane Adhesive Sealant 540•3M™, for example.

As noted above, the top 28 of cartridge 22 also is sealed against moisture by cap 26 which is removeably secured to the detector cartridge 22 by aligning slots 34a,b (see FIG. 11) with tabs 30a,b. The cap 26 is then moved in the direction of arrow 38 to frictionally engage the cap interior sidewall 36 against a rubber o-ring 40 or other suitable sealing device which removeably secures the cap 26 to casing 32. The sealing device or o-ring 40 inhibits the environment and/or moisture from entering and attacking the internal components of the detector cartridge 22. (In one embodiment, the cap 26 also serves to seal the bait station 10 by covering housing opening 16).

In one embodiment, the specific placement of the cap 26 by alignment of tabs 30 and slots 34 further serves to orient the closure of the cap 26 on the casing 32 at a predetermined location and position so that an end user can selectively lock the cap 26 in place and/or activate the sensor unit 68 of the detector. For example, as illustrated in FIG. 4, cap 26 is placed on the casing 32 in a first sealed position by alignment of tabs 30 and slots 34 to frictionally engage the o-ring 40 as described above. The cap 26 is then oriented to a second locked position by pressing together the cap 26 (direction 38) and casing 34 (direction 39) while turning the casing 32 clockwise 90 degrees (direction 41).

In another embodiment, as shown in FIG. 5, the cap interior 36 can be configured to engage a plunger switch 70 located at the top of printed circuit board (PCB) 74 while the cap 26 is oriented from a first to a second position so that the switch 70 is moved downward (direction 71) from an open condition (shown) to a closed condition in order to activate the sensor unit 68 before cartridge 22 is placed in the station housing 12.

Referring to FIGS. 8-11, a casing assembly 32 of the detector cartridge 22 is shown in the form of a molded plastic housing that defines first and second interior spaces 66 ("bottom") and 80 ("top"). The first interior space 66 is designed to hold plug 52 and to guide foraging termites to opening 67 which leads to the second interior space 80. The second interior space 80 is adapted for mounting the sensor unit components 68. For example, opposed side edges 84a,b of PCB 74 slideably fit within corresponding opposed slots 72a,b formed in the wall 81 of the second interior space 80. Likewise, partitions 76 extending from the wall 81 form opposed compartments that are arranged to receive and hold batteries 78a,b. In FIG. 11, the cap 26 can be provided with screw threads on the interior side wall 36 that are arranged to receive corresponding screw threads located at the top portion 28 of the detector cartridge. In one embodiment, the cap 26 is removable to enable, for example, battery replacement.

As shown in FIGS. 12-15, a more detailed view of a sensor unit in accordance with one embodiment of the invention is shown. The sensor unit 68 has a printed circuit board (PCB) 74 having a top edge 82, opposed side edges 84a,b, a notched bottom edge 85, a switch 70, batteries 78a,b (depicted as two standard AA size cells), and a light conductive assembly 94 comprising two photonic devices including a light source such as a light emitting diode (LED) 86 and a photodetector such as a photodiode 88 and two optical components in the form of acrylic prisms 90 and 92. Each prism 90, 92 has at least one respective light propagating surface or face 95a,b which form between them a spatial region 96 (together with notched bottom 85 of PCB 74) when the sensor unit 68 is in an assembled condition. The spatial region is filled with ambient air unless a bait member 64 is present therein.

The PCB 74 can also include (not shown) an antenna, a microprocessor, a telemetry unit, Random Access Memory (RAM), an analog-digital (A/D) converter and an input-output I/O port. In a well-known manner, an electrical signal generated by the photodiode is applied to the microprocessor via the A/D converter, which processes the electrical signal to provide physical characteristic data messages. The microprocessor can be programmed to appropriately format the physical characteristic data messages so that it can be transmitted over a wireless or wired communication link.

The external surfaces of the prisms 90, 92 can be provided with metalized or painted coating such as a silver coating, for example, to reduce the loss of light from the assembly when the LED 86 is illuminated and/or to reduce the amount of ambient light that otherwise reaches the photodiode 88.

In one embodiment, the light conductive assembly 94 will cause the light propagation to be redirected through total internal reflection. Total internal reflection being achieved by the incident light arriving at the assembly-to-air interface at an angle to the normal to that interface greater than the critical angle. The critical angle being;

$$\theta c = \arcsin(n_{air}/n_{assembly})$$

Where:
$n_{air}$=Refractive index of air
$n_{assembly}$=Refractive index of optical assembly (acrylic=1.49)

Thus for an acrylic component all incident light angles would be >42° to the normal.

Suitable light sources can be coherent or non-coherent. For example, incandescent or luminescent lights sources such as LEDs or incandescent or fluorescent bulbs can be used. Ambient light is also suitable. Polychromatic or monochromatic light having a wavelength in the range of 190 nm to 2000 nm; in particular from 400 nm to 700 nm can be used. Light in the range of 510 nm to 650 nm; specifically from 590 nm to 650 nm is also particularly suitable. Infrared, red and amber colored light sources may also be mentioned.

Suitable photodectectors include, for example, photoresistors or light dependent resistors (LDR), photovoltaic cells or solar cells, photodiodes which can operate in photovoltaic mode or photoconductive mode, photomultiplier tubes and phototubes containing a photocathode which emits electrons when illuminated and in general behaves as a photoresistor, for example.

When mounted on the PCB 74, the light propagating surfaces 95 of prisms 90 and 92 are opposed to one another and form between them a spatial region 96 that is sized to accommodate a termite bait member 64. For example, the bait member can be sized to be snugly received within the spatial region with only a small amount of clearance or with a friction fit. The dimensions of the spatial region 96 are delimited by the height of the PCB 74, the area of notch 85 and the opposed light propagating surfaces or faces 95a,b of prisms 90 and 92 which are spaced apart at a distance which substantially corresponds to the height of the PCB to form an optical cell or spatial region 96. The height of the spatial region can be selected to substantially correspond with the dimensions of the target pest species such as a termite species. The spatial region 96 is further defined by a slot-like opening which extends in the transverse direction of the PCB edges 84a,b.

In one embodiment, the opening 67 is sealed or partially sealed by the bait member 64, thereby allowing eventual access to the spatial region by the target pest. Once the external portion of the bait member 64 is consumed, the termites may selectively pass through the opening 67 due to the height thereof. For example, the opening may have a size substantially corresponding with the dimensions of the target termite. In this way, non-target insect pests that are sized larger than the opening are selectively excluded or restricted from entering the spatial region 96. In one embodiment, the height $h^1$ of the opening (see FIG. 19) is such that termites are substantially discouraged from constructing mud tubes within the spatial region 96, but without impeding the termites from consuming or displacing at least a portion of the bait member 64.

As shown in FIG. 16, light beam 98 propagating from LED 86 is spread out by prism 90 along various propagation paths as exemplified by (P1, P2, P3) (See also FIG. 26) and directed across the optical cell or spatial region 96 to interrogate bait member 64. The bait member substantially prevents light emitted by the LED from continuing across the optical cell to reach prism 92 and the photodetector optically associated at the top of such prism. Any change in the optical properties of the bait member 64 (transmittance, reflectance, scattering or absorption) will affect the amount of light that propagates across the optical cell to the prism 92. For example, consumption or displacement of the bait member occasioned by termite activity can result in one or more such changes in optical properties. Such changes in optical properties will change the amount of light that reaches the photodetector 88. Light changes that are measured by the photodetector can be logged manually or by a data logger and then correlated with termite or other target pest activity.

Turning to FIG. 17, an alternate embodiment of an optical detector cartridge is shown where light is input into an outer incident surface portion of plastic sheet 102 from a fluorescent lamp 100. The sheet 102 and corresponding sheet 104 are made of transparent or substantially transparent plastic and comprise first and second optical components forming a spatial region. A bait member 106 is sandwiched in between the optical components in the spatial region and prevents or substantially reduces light from the lamp 100 from reaching the photovoltaic film 108 which is adhered to the outer surface. Termites entering the various openings around the perimeter of the assembly consume or displace the bait 106 so that when lamp 100 is energized via wire 110, a voltage increase from the photovoltaic film 108 can be recorded which can be interpreted manually or automatically as corresponding to termite activity.

FIG. 18 illustrates yet another alternate embodiment of an optical detector cartridge of the invention wherein both the LED 114 and photodetector 118 are on one side of the PCB 116 and the light conductive assembly comprises a "one-piece" prism assembly having a hollow chamber which encloses the bait member 122. More specifically, optical component 112 and prism component 124 form between them a spatial region which contains the bait member 122. Termites can enter the cartridge through conical guide 120 to intercept the bait member 122 at the apex thereof. Consumption or displacement of the bait member 122 allows light beam 126 to propagate from LED 114 through prism 124 to reach photodiode 118. This increase in light transmission through the spatial region is indicative of termite activity.

As shown in FIG. 19, a basic detection assembly in accordance with the invention is shown wherein first 128 and second 130 spaced apart components form spatial region 138 between opposed surfaces. The spatial region 138 has a height $h^1$ which substantially corresponds with the dimensions of a target pest. Bait member 132 is contained or partially contained within the spatial region. Light emanating from light source 134 is obscured by the bait member so that an observer 136 can not sense or observe the light along interrogation path 140. Consumption or displacement of the bait member 132 by a target pest (such as a rodent, insect, or the like) allows light to be detected, sensed or observed along the interrogation path 140. The height of the spatial region 138 inhibits or deters target pests from moving detritus into the spatial region so that the light from 134 is not obscured.

In one embodiment, the termite edible material from which the passive bait cartridge 20 is formed comprises at least two different forms, presentations or physical consistencies of a cellulose containing material. Examples of different forms of cellulose containing materials include those that are not repellent to termites such as wood, paper (incl. recycled), corrugated cardboard, pressed cardboard, wood flour, and sawdust. For example, a wood piece, a roll of corrugated cardboard, and a pressed cardboard tube are each considered to be different forms or presentations of a cellulose material for the purpose of the invention. Those skilled in the art will understand that various types of wood may be suitable for use as cellulose materials and each in various forms or presentations as paper, sawdust, wood, corrugated cardboard or pressed cardboard, for example. Examples of suitable wood include basswood, aspen, cottonwood, paper birch, soft maple, yellow poplar (tulip poplar), beech, pecan, hard maple, persimmon, southern yellow pine, balsam fir and Engelmann spruce. The various distinct cellulose forms or presentations can be derived from these examples of wood sources.

In one embodiment, the station 10 is installed by placement in the ground or other appropriate location for a time sufficient to allow termite infestation. The station or device 10 can be placed in the ground directly by being driven into the soil or placed into a pre-existing hole or location of sufficient dimension to allow the device to remain in position. Once termites are detected in the station, the detector cartridge is removed and the passive bait cartridge comprised predominantly of a termite edible material can be replaced with another cartridge also comprised predominantly of a termite edible material which further contains an effective amount of a non-repellant termiticide. For example, at least one of the cellulose containing materials from which the bait cartridge is formed such as a corrugated cardboard substrate can be impregnated with the termiticide.

Suitable non-repellant termiticides include the chitin synthesis inhibitors such as hexaflumuron, flufenoxuron, lufenuron and dimilin, juvenile hormone mimics such as methoprene and pyriproxyfen, stomach toxicants such as sulfuramide. Benzoylureas such as lufenuron are particularly suitable. Effective amounts of these materials for use in termite baiting stations to control termites are known to those skilled in the art. For example, the amount of toxicant needed to control termites will vary, depending on the particular toxicant used, but in general an amount between about 1 and about 5,000 parts per million (ppm) of toxicant to bait will be utilized in at least one of the cellulose containing materials; particularly an amount between about 10 and about 200 ppm may be used, and more particularly between about 50 and about 1500 ppm. Toxicants such as lufenuron employed at a concentration of 1500 ppm are particularly suitable.

In addition, any known termite killing or controlling agent or termiticide can also be used in the practice of the invention in combination with above-ground or below ground bait stations and the detectors of the invention. These include, as noted above, chitin synthesis inhibitors such as hexaflumuron, flufenoxuron, lufenuron and dimilin, juvenile hormone mimics such as methoprene and pyriproxyfen, stomach toxicants such as sulfuramide, as well as abamectin, cryolite, boric acid and alkali and alkaline earth salts of boric acid, and contact insecticides such as thiamethoxam, imidacloprid and fipronil, or mixtures or combinations of these agents.

In yet another embodiment, a plurality of stations 10 (and/or above-ground variants thereof) are installed around or in the vicinity of a building or wooden structure to reduce the likelihood of termite infestations occurring therein. The present invention also contemplates such a system or array of stations as well as the method for using such system or array alone or in combination with conventional perimeter termiticide spray applications to control termites in the vicinity of a building or wooden structure to be protected. In addition, above-ground stations can be employed in-lieu of or in addition to the below-ground stations. Both above-ground and below-ground stations can be adapted to accommodate a detector cartridge in accordance with the invention.

Examples of termite species which can be monitored, detected or controlled by use of the disclosed apparatus, device and method include *Coptotermes formosanus, Reticulitermes flavipes, R. hesperus, R. virginicus, R. tibialis*, and *Heterotermes aureus*, as well as termite species of the families (and pest genera) Mastotermitidae (*Mastotermes* species), Hodotermididae (*Anacanthotermes, Zootermopsis* species), Rhinotermitidae (*Coptotermes, Heterotermes, Reticulitermes, Psammotermes, Prorhinotermes, Schedorhinotermes* species), Kalotermitidae (*Glyptotermes, Neotermes, Cryptotermes, Incisitermes, Kalotermes, Marginitermes* species), Serritermitidae, and Termitidae (*Pericapritermes, Allodonternes, Microternes, Odontoternes, Nasutiternes, Termes, Amiternes, Globitermes, Microceroternes* species), Termopsidae (*Hodotermopsis, Zootermopsis* species), and other pest species of termites. The apparatus, devices, stations, systems and methods of the invention have been found to be particularly suitable for controlling subterranean termites.

The following examples describe specific embodiments within the scope of the invention. Other embodiments within the scope of the claims herein will be apparent to one skilled in the art from consideration of the specification or practice of the invention as disclosed herein. It is intended that the specification, together with the examples, be considered exemplary only, with the scope and spirit of the invention being indicated by the claims which follow the examples. In the examples all percentages are given on a weight basis unless otherwise indicated.

EXAMPLES

1. Preparation of Optical Detector

A cellulose containing section of card was cut to size and inserted into the gap or spatial region 96 between the prism faces of the optical cell to form a bait member 64, obscuring the light path. A pre-formed section of expanded polystyrene (EPS) 52 was inserted into the guide flange 54, ensuring a tight fit, and that the apex of the EPS "bung" was in contact with the cellulose card 64 at the opening of the optical cell.

2. Recording of Initial Transmission of Light

Using an interrogation box and voltage meter attached to the detector cartridge 22 by cable 150, two parameters were recorded:

X4, the voltage across the photodetector when the probe light was not illuminated.

X5, the voltage across the photodetector when the probe light was illuminated.

X4 records any ambient light, thus X5–X4 represents the voltage induced by the probe light, and will be related to the amount of material obscuring the light path.

X5 was also recorded with no material obscuring the light path; this identified the maximum light that could be transmitted by the light conductive assembly.

3. Assembly of Test Unit

Each optical detector cartridge 22 of replicates 1-3, respectively, was placed in a large container of soil and wood with an established colony of termites, *Reticulitermes santonensis*. The end of the detector plugged with the EPS was buried approximately 1 cm into the soil 152, near wood 154 known to be infested with termites (See FIG. 20*a*).

The assembled test units were placed in a controlled environment room at a temperature of 28° C. with no light for three days.

4. Measurement of Light Transmission

After three days without disturbing the detectors, the interrogation box was reconnected and the value of X4 and X5 recorded. The change in light transmission was calculated thus: (X5–X4) day 3–(X5–X4) day 0)

This was then expressed as a percentage of the maximum that could be transmitted—X5–X4 day 0.

Results

| | All readings in mv | | | | |
|---|---|---|---|---|---|
| | Day 0 | | | | Potential max |
| Replicate | X4 | X5 | X5 – X4 | X5 no card | increase |
| 1 | 0 | 3.5 | 3.5 | 40.8 | 37.3 |
| 2 | 0 | 1.3 | 1.3 | 14.6 | 13.3 |
| 3 | 0 | 1.5 | 1.5 | 16.2 | 14.7 |
| | Day 3 | | | | |
| | X4 | X5 | X5 – X4 | Increase from day 0 | % of max |
| 1 | 0.3 | 34.2 | 34.2 | 30.7 | 82.3 |
| 2 | 0 | 12.6 | 12.6 | 11.3 | 85.0 |
| 3 | 0 | 12.1 | 12.1 | 10.6 | 72.1 |

Figure 20A:
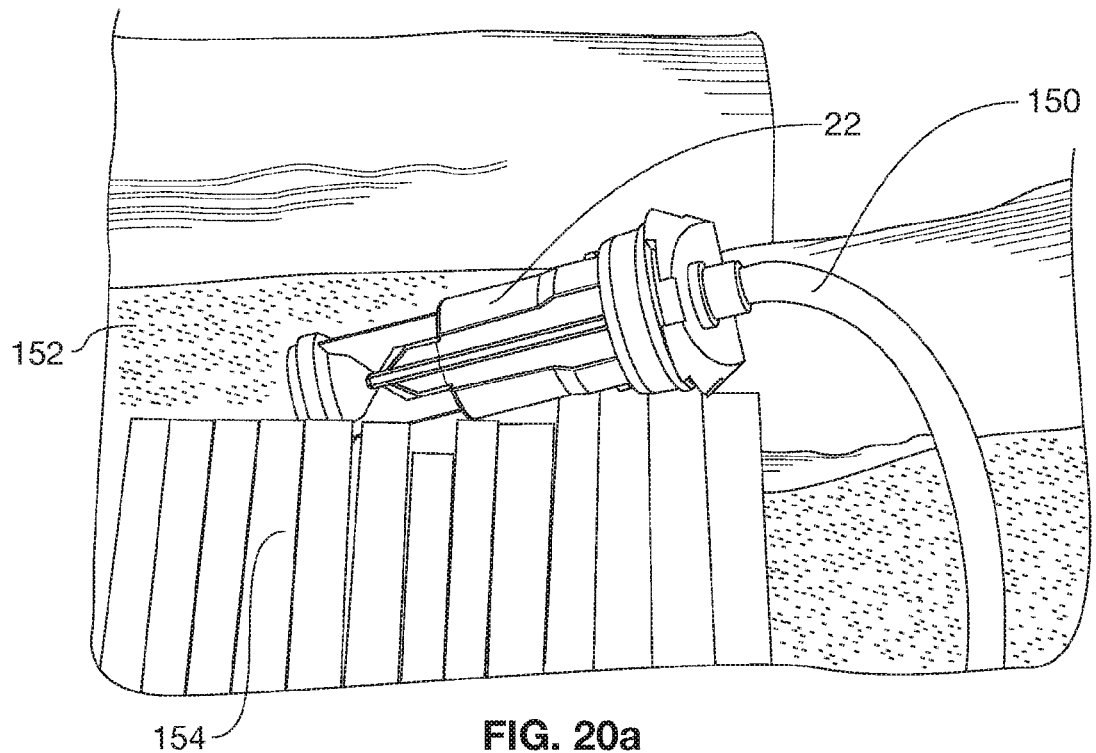
Figure 20B:
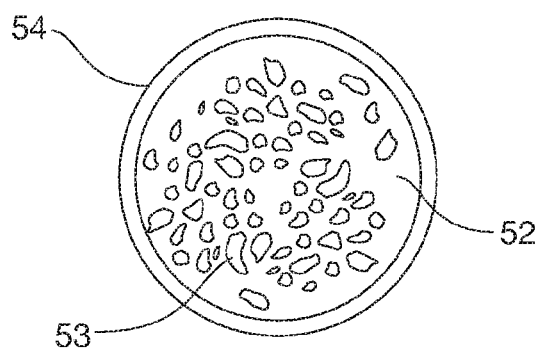
Figure 20C:
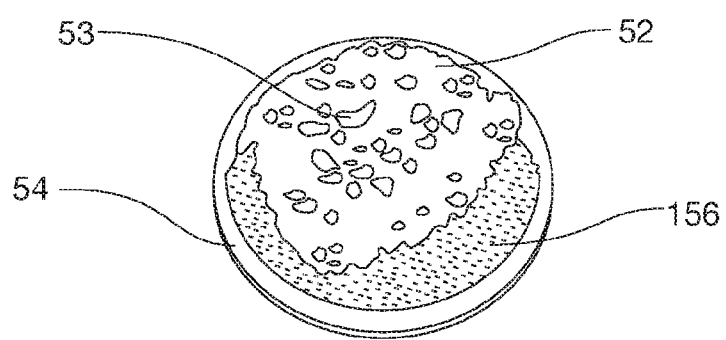
Figure 20D:
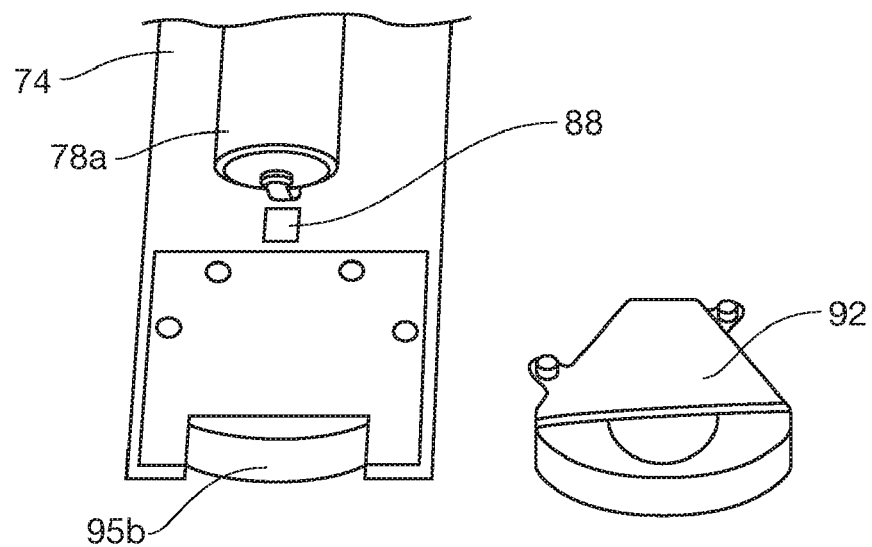

Visual Observations:

When the optical detector cartridge was removed from the soil, termites were seen to have readily tunneled (53) into the EPS (See FIGS. 20*b-c*). When the optical cell was disassembled (FIG. 20*d*) all the card was consumed in replicates 1 and 2, and approximately 90% of the card in replicate 3 was consumed. There was slight soiling of the prism surfaces.

The remaining card had been consumed from the lower edge, rather than having been grazed on the surface.

CONCLUSIONS

The termites readily excavated the EPS producing tunnels. They also consumed the cellulose card (bait member) that obscured the light path between the light source and photo-detector, making a clear path.

The removal of the card by the termites led to an increase of light transmission or propagation, resulting in higher voltages being recorded at the photo-detector.

The increased transmission of light through the card, recorded by the photodetector is directly correlated to the presence and activity of the termites. As termites are known to be one of the few organisms that can excavate EPS and consume cellulose, an increase in transmitted light, in the described apparatus, will be diagnostic of the presence of termites.

Although the foregoing invention has been described in some detail by way of illustration and example for purposes of clarity of understanding, it will be obvious that certain changes and modifications can be made which are within the full scope of the invention.

What is claimed is:

1. A method of detecting the presence of target pests which comprises:
   (a) encouraging a first characteristic behavior by the pests that is indicative of the presence of one or more of the pests, the first characteristic behavior selected from bait consumption and bait displacement; (b) discouraging a second characteristic behavior by the pests that at least partially interferes with detection of the first characteristic behavior, the second characteristic behavior selected from backfilling with detritus, constructing mud tubes and constructing galleries; and (c) observing, detecting or sensing an occurrence of the first characteristic behavior by one or more of the pests.

2. A method according to claim 1, wherein the target pest is selected from rodents and insects.

3. A method according to claim 2, wherein the insect is a termite.

4. A device for monitoring, detecting and/or controlling target pests that comprises:
   (1) a detection assembly including first and second spaced apart components having first and second opposed surfaces and forming between them at least one spatial region;
   (2) at least one opening in pest communication with said spatial region to allow access to the spatial region of the assembly by the target pests; and
   (3) at least one bait member comprised of one or more materials susceptible to consumption or displacement by the target pests which is adapted be contained or partially contained within the spatial region;
   wherein the spatial region is configured to encourage the target pests to consume or displace at least a portion of the bait member and to discourage or restrict the target pests from backfilling the region with detritus.

5. A device according to claim 4, wherein the target pest is selected from rodents and insects.

6. A device according to claim 5, wherein the insect is a termite.

7. A device for monitoring, detecting and/or controlling pests comprising at least one photonic device; a light conductive assembly in optical association with the at least one photonic device, the assembly comprising first and second spaced apart components having first and second opposed light transmitting surfaces forming between them a spatial region adapted to contain a pest bait member comprised of one or more materials susceptible to consumption or displacement by the pests.

8. A device according to claim 7, wherein the target pest is selected from rodents and insects.

9. A device according to claim 8, wherein the insect is a termite.

10. A detector according to claim 9, wherein the spatial region of the termite detector is configured such that termites are substantially discouraged from constructing mud tubes within said region without impeding the termites from consuming or displacing at least a portion of the bait member therein.

11. A detector according to claim 7, which further comprises a data collector that processes an electric signal from the at least one photonic device to provide data relating to removal or displacement of the bait member.

12. A detector according to claim 11, which further comprises a transmitter that transmits said data over a wired or wireless communication link.

13. A device according to claim 7, wherein the light conductive assembly is sealed in a weather-resistant enclosure.

14. A device according to claim 13, wherein the assembly is enclosed in a station housing having at least one opening hermetically sealed with a material through which the pests can tunnel or chew.

15. A pest detector comprising a substantially opaque bait member; a light source operable to direct light onto at least a portion of the bait member; and a light detector operable to detect at least some light emitted by the light source; wherein the bait member, light source, and light detector are arranged such that the bait member substantially prevents light emitted by the light source from being detected by the light detector when the bait member is unaltered, and such that at least some light emitted by the light source is detectable by the light detector when at least a portion of the bait member is consumed or displaced by pest activity.

16. A device according to claim 15, wherein the target pest is selected from rodents and insects.

17. A device according to claim 16, wherein the insect is a termite.

18. A termite detector comprising:
   (1) a light source from which a light beam propagates when the light source is energized;
   (2) a light detector having a light receiving surface and producing an electric signal in response to light incident on the light receiving surface; and
   (3) a light conductive assembly in optical association with the light source and the light detector, the light conductive assembly including: first and second spaced-apart optical components having respective first and second opposed light transmitting surfaces forming between them a spatial region adapted to contain a termite bait member comprised of one or more materials susceptible to consumption or displacement by termites and having a optical transmission characteristics different from ambient air.

19. A detector according to claim 18, wherein the first and second optical components have light directing properties that cooperate to direct at least a portion of the light beam that propagates from the light source between the first and second light transmitting surfaces when the light is energized and to direct at least a portion of said light beam on to the bait member which has an optical density greater than ambient air which impedes or partially impedes transmission of the light beam.

20. A bait station for monitoring, detecting and/or controlling subterranean termites comprising:
   an outer housing adapted to be implanted in the ground having a plurality of openings through a side wall of the outer housing for passage of termites through the openings into an interior of the outer housing, the interior of the outer housing adapted to receive at least one cartridge selected from a termite bait cartridge and a termite detector cartridge;
   the bait cartridge comprising one or more materials susceptible to consumption or displacement by termites and, optionally, a termite toxicant;
   the detector cartridge comprising at least one photonic device; a light conductive assembly in optical association with the at least one photonic device, the assembly comprising first and second spaced apart components having first and second opposed light transmitting surfaces forming between them a spatial region adapted to contain a termite bait member comprised of one or more materials susceptible to consumption or displacement by termites and having optical transmission characteristics that differ from ambient air.

21. A termite monitoring or control system, comprising: a plurality of subterranean termite monitoring or baiting stations, two or more of said stations each including a substantially opaque bait member; a light source operable to direct light onto at least a portion of the bait member; and a light detector operable to detect at least some light emitted by the light source; wherein the bait member, light source, and light detector are arranged such that the bait member substantially prevents light emitted by the light source from being detected by the light detector when the bait member is unaltered, and such that at least some light emitted by the light source is detectable by the light detector when at least a portion of the bait member is consumed or displaced by pest activity, the second one of the stations being spaced apart from the first one of the stations.

22. A termite monitoring or control system, comprising: a plurality of above-ground termite monitoring or baiting stations, two or more of said stations each including a substantially opaque bait member; a light source operable to direct light onto at least a portion of the bait member; and a light detector operable to detect at least some light emitted by the light source; wherein the bait member, light source, and light detector are arranged such that the bait member substantially prevents light emitted by the light source from being detected by the light detector when the bait member is unaltered, and such that at least some light emitted by the light source is detectable by the light detector when at least a portion of the bait member is consumed or displaced by pest activity, the second one of the stations being spaced apart from the first one of the stations.

* * * * *